(12) United States Patent
Alfaro, Jr.

(10) Patent No.: US 11,936,173 B2
(45) Date of Patent: Mar. 19, 2024

(54) DEADEND ANTI-ROTATION CLAMP

(71) Applicant: Hubbell Incorporated, Shelton, CT (US)

(72) Inventor: Paul Alfaro, Jr., Orange, CA (US)

(73) Assignee: Hubbell Incorporated, Shelton, CT (US)

( * ) Notice: Subject to any disclaimer, the term of this patent is extended or adjusted under 35 U.S.C. 154(b) by 65 days.

(21) Appl. No.: 17/568,890

(22) Filed: Jan. 5, 2022

(65) Prior Publication Data

US 2022/0216681 A1 Jul. 7, 2022

Related U.S. Application Data

(60) Provisional application No. 63/134,401, filed on Jan. 6, 2021.

(51) Int. Cl.
*H02G 7/00* (2006.01)
*H01B 17/56* (2006.01)
*H02G 7/05* (2006.01)

(52) U.S. Cl.
CPC ............. *H02G 7/056* (2013.01); *H01B 17/56* (2013.01)

(58) Field of Classification Search
CPC ................................ H02G 7/056; H01B 17/56
See application file for complete search history.

(56) References Cited

U.S. PATENT DOCUMENTS

| 4,643,512 | A | 2/1987 | Prodel | |
|---|---|---|---|---|
| 6,730,852 | B1* | 5/2004 | Puigcerver | H01B 17/58 |
| | | | | 174/138 F |
| 11,085,480 | B2 | 8/2021 | Polidori | |
| 2008/0310071 | A1* | 12/2008 | Jeon | H02G 13/80 |
| | | | | 361/117 |
| 2009/0188698 | A1* | 7/2009 | Cloutier | H01B 17/10 |
| | | | | 174/172 |
| 2013/0082152 | A1 | 4/2013 | Bundren et al. | |
| 2015/0207305 | A1* | 7/2015 | Lynch | H01B 17/00 |
| | | | | 174/40 CC |
| 2016/0233010 | A1* | 8/2016 | Hiller | H01B 19/00 |
| 2020/0251833 | A1* | 8/2020 | Schumann | H02G 7/05 |

FOREIGN PATENT DOCUMENTS

| KR | 20110048207 A | 5/2011 |
|---|---|---|
| WO | 2002073765 A1 | 9/2002 |

OTHER PUBLICATIONS

KR 2013030560 English Translation; published in 2013 (Year: 2013).*
International Search Report and Written Opinion for corresponding international (PCT) application No. PCT/US22/11234, 10 pages, dated Mar. 29, 2022.

* cited by examiner

*Primary Examiner* — Pete T Lee
(74) *Attorney, Agent, or Firm* — Ruggiero, McAllister & McMahon LLC

(57) ABSTRACT

A guard assembly is provided that includes a guard cover portion to cover a power line assembly. The power line assembly has an insulator. The guard assembly also has a clamp that connects to the insulator. The guard cover portion clips onto the clamp.

24 Claims, 21 Drawing Sheets

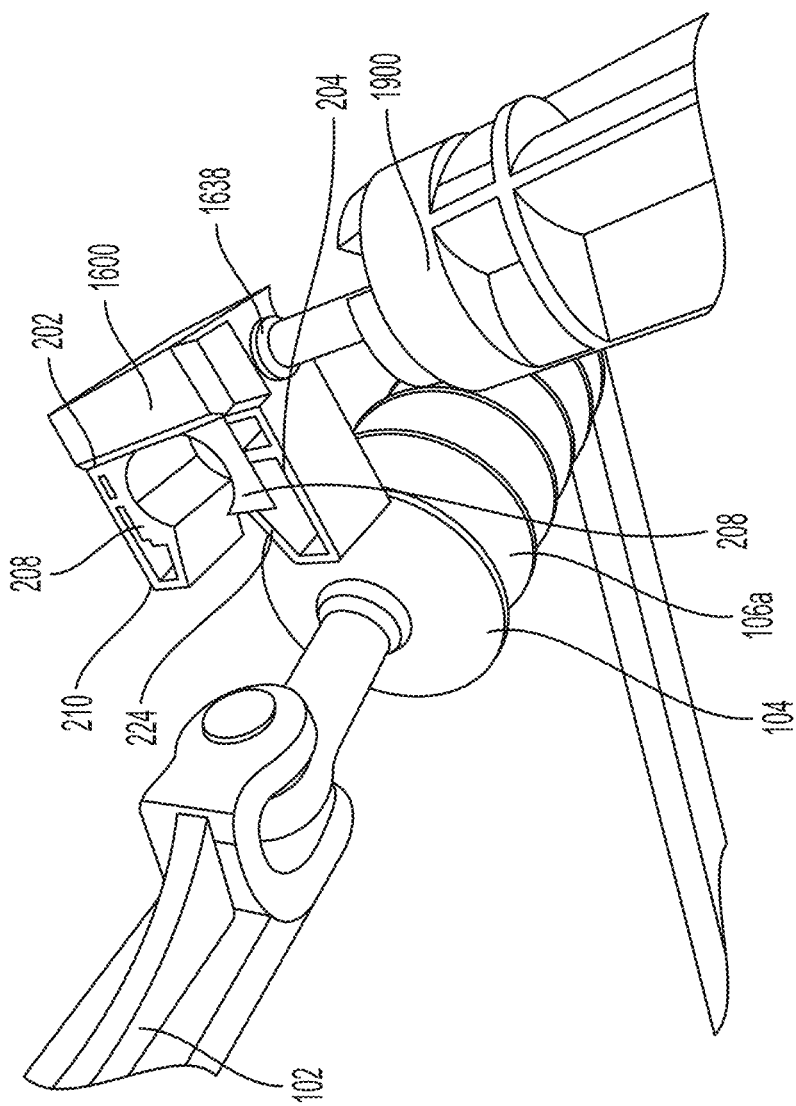

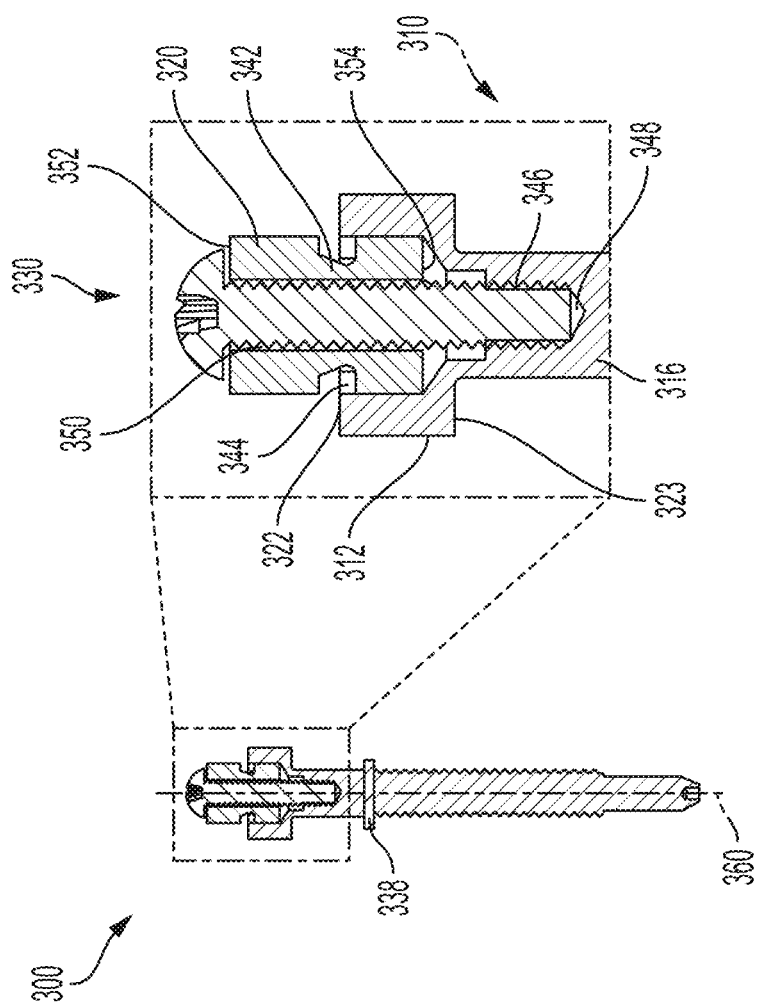
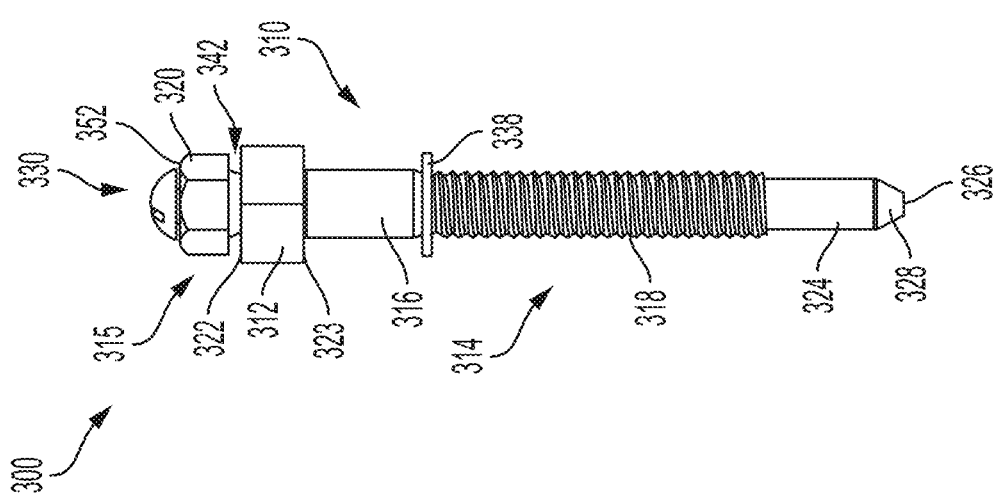
FIG. 25
FIG. 24

DEADEND ANTI-ROTATION CLAMP

CROSS REFERENCE TO RELATED APPLICATIONS

This application claims the benefit of U.S. Provisional Application 63/134,401 filed Jan. 6, 2021, the contents of which are incorporated by reference herein.

BACKGROUND

1. Field of the Invention

The present disclosure is related to guards used with power lines. More particularly, the present disclosure is related to a guard assembly having a clamp mounted to an insulator of a deadend.

2. Description of Related Art

Deadend guards used with power lines undesirably flip around on an axis so that the guard no longer provides protection from above. Existing solutions rely on the equipment to provide orientation of the guard, by attaching a pin or device into an equipment crevice or feature to secure position. However, the installed deadend could be leaning or twisted on an axis due to tension and hardware configuration, allowing for a suboptimal or useless guard effort.

Accordingly, it has been determined by the present disclosure that there is a continuing need for a guard assembly that overcomes, alleviates, and/or mitigates one or more of the aforementioned and other deleterious effects of prior devices.

SUMMARY

The present disclosure provides a guard assembly having a clamp that mounts directly to the insulator of a deadend. The end user will be required to vertically orient the clamp relative to the ground regardless of the deadends existing position. This clamp ensures correct placement of the guard as well as a positive retention to the clamp itself.

A guard assembly is provided that includes a guard cover portion to cover a power line assembly. The power line assembly has an insulator. The guard assembly also has a clamp that connects to the insulator. The guard cover portion clips onto the clamp.

A method of installing a guard assembly is also provided that includes attaching a clamp to an insulator of a power line and pivoting the clamp to ensure it is tightened in a vertical orientation; connecting a guard cover portion to the clamp to overlap a portion of the insulator.

A guard assembly is also provided that includes a power line assembly having a conductor connected to a deadend clamp and an insulator, a clamp connected to the insulator, a first guard cover portion connected onto the clamp, and a second guard cover portion that is connected to the first guard cover portion to cover the power line assembly.

In some embodiments either alone or together with any one or more of the aforementioned and/or after-mentioned embodiments, the clamp has a fixed jaw and a moveable jaw that are moveable relative to one another to accommodate different sizes of the insulator.

In some embodiments either alone or together with any one or more of the aforementioned and/or after-mentioned embodiments, the clamp has a bolt that passes through the fixed jaw and the moveable jaw, and the bolt is rotatable to move the fixed jaw and the moveable jaw relative to one another.

In some embodiments either alone or together with any one or more of the aforementioned and/or after-mentioned embodiments, the clamp has a first jaw face that fits in the fixed jaw and a second jaw face that fits in the moveable jaw so that the first jaw face is opposite the second jaw face.

In some embodiments either alone or together with any one or more of the aforementioned and/or after-mentioned embodiments, the fixed jaw has a slot that forms edge walls on opposite sides of the slot and the moveable jaw has grooves on opposite sides of a slider, and the slider is moveable in the slot.

In some embodiments either alone or together with any one or more of the aforementioned and/or after-mentioned embodiments, the fixed jaw has an opening that has threads and the moveable jaw has an opening that has threads, and the bolt has threads that mate with the threads of the opening in the fixed jaw and the threads in the opening in the moveable jaw.

In some embodiments either alone or together with any one or more of the aforementioned and/or after-mentioned embodiments, the guard cover portion is a first guard cover portion and a second guard cover portion, and the first guard cover portion and the second guard cover portion are sized to fit over the power line assembly that includes a deadend clamp.

In some embodiments either alone or together with any one or more of the aforementioned and/or after-mentioned embodiments, the guard cover portion is a first guard cover portion and a second guard cover portion, and the first guard cover portion and the second guard cover portion are sized to fit over the power line assembly that includes a wedge.

In some embodiments either alone or together with any one or more of the aforementioned and/or after-mentioned embodiments, the clamp is made of a thermoplastic compound.

In some embodiments either alone or together with any one or more of the aforementioned and/or after-mentioned embodiments, the guard cover portion is a first guard cover portion, and further comprising connecting a second guard cover portion to the first guard cover portion.

In some embodiments either alone or together with any one or more of the aforementioned and/or after-mentioned embodiments, the clamp attaches to the insulator between a first shed and a wedge.

In some embodiments either alone or together with any one or more of the aforementioned and/or after-mentioned embodiments, the clamp has a fixed jaw and a moveable jaw that are moveable relative to one another to accommodate different sizes of the insulator, and further comprising moving the fixed jaw and the moveable jaw closer to one another to connect the clamp to the insulator.

In some embodiments either alone or together with any one or more of the aforementioned and/or after-mentioned embodiments, the clamp has a fixed jaw and a moveable jaw that are moveable relative to one another to accommodate different sizes of the insulator and the fixed jaw has an opening that has threads and the moveable jaw has an opening that has threads, and a bolt has threads that mate with the threads of the opening in the fixed jaw and the threads in the opening in the moveable jaw, and further comprising rotating the bolt to move the fixed jaw and the moveable jaw closer to one another to connect the clamp to the insulator.

In some embodiments either alone or together with any one or more of the aforementioned and/or after-mentioned embodiments, the clamp has a fixed jaw and a moveable jaw that are moveable relative to one another to move closer to one another to connect to the insulator.

In some embodiments either alone or together with any one or more of the aforementioned and/or after-mentioned embodiments, the clamp has a bolt that passes through the fixed jaw and the moveable jaw, and wherein the bolt is rotatable to move the fixed jaw and the moveable jaw relative to one another.

In some embodiments either alone or together with any one or more of the aforementioned and/or after-mentioned embodiments, the clamp has a first jaw face that fits in the fixed jaw and a second jaw face that fits in the moveable jaw so that the first jaw face is opposite the second jaw face to contact the insulator.

In some embodiments either alone or together with any one or more of the aforementioned and/or after-mentioned embodiments, the fixed jaw has a slot that forms edge walls on opposite sides of the slot and the moveable jaw has grooves on opposite sides of a slider, and the slider is moveable in the slot.

In some embodiments either alone or together with any one or more of the aforementioned and/or after-mentioned embodiments, the fixed jaw has an opening that has threads and the moveable jaw has an opening that has threads, and the bolt has threads that mate with the threads of the opening in the fixed jaw and the threads in the opening in the moveable jaw.

In some embodiments either alone or together with any one or more of the aforementioned and/or after-mentioned embodiments, the bolt is a torque bolt having a necked down area that is broken during installation of the guard assembly when a predetermined tension is applied.

In some embodiments either alone or together with any one or more of the aforementioned and/or after-mentioned embodiments, the torque bolt has a hex head above the necked down area and a loop below the necked down area.

In some embodiments either alone or together with any one or more of the aforementioned and/or after-mentioned embodiments, the bolt is a captive shear bolt assembly having a shear section that is broken during installation of the guard assembly when a predetermined tension is applied, and, when the shear section has sheared, an upper head or stud remains connected to a remainder of the captive shear bolt assembly.

In some embodiments either alone or together with any one or more of the aforementioned and/or after-mentioned embodiments, a pin passes through the first guard cover portion and the second guard cover portion through opposite walls.

The above-described and other features and advantages of the present disclosure will be appreciated and understood by those skilled in the art from the following detailed description, drawings, and appended claims.

DESCRIPTION OF THE DRAWINGS

FIG. 19 a rear, bottom perspective view of the clamp of FIG. 16 being installed with a hot stick onto an insulator;

FIG. 24 is another example captive shear bolt assembly;

FIG. 25 is a cross-section view of the example captive shear bolt assembly shown in FIG. 24;

DETAILED DESCRIPTION

Figure 1:
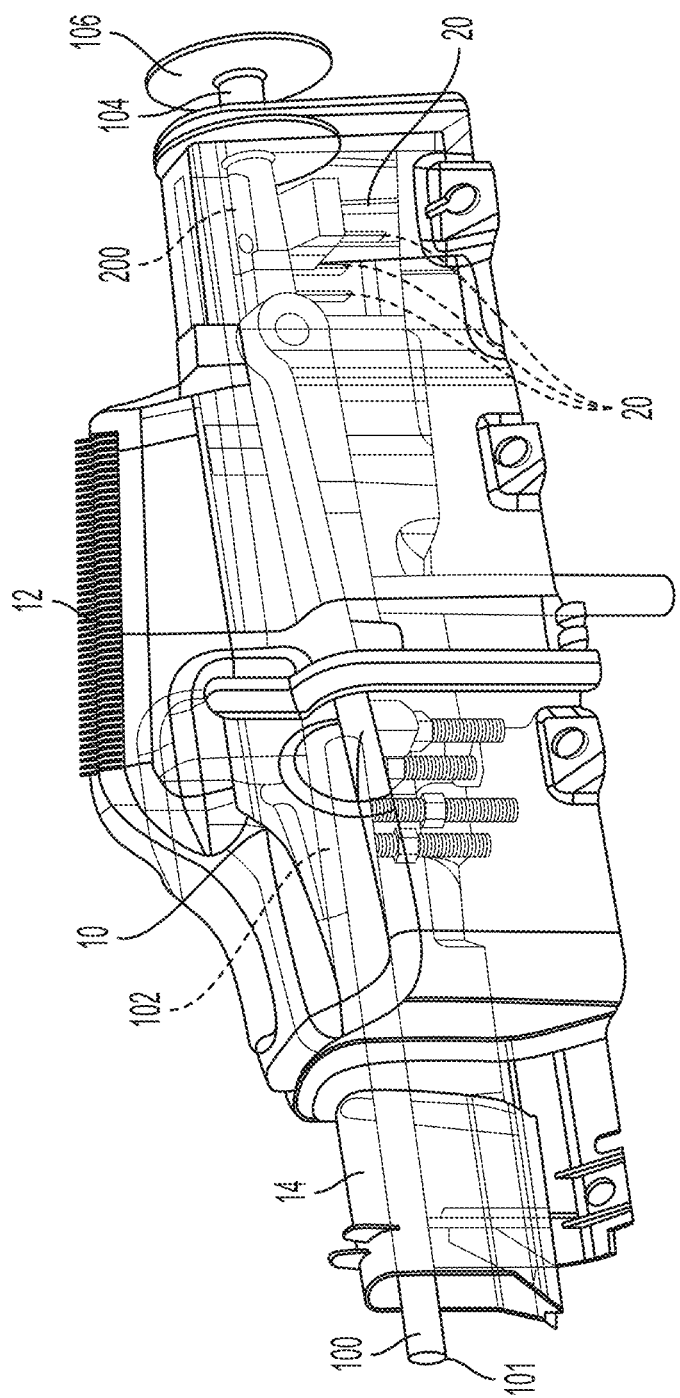
FIG. 1 is a front perspective view of an exemplary embodiment of a guard assembly of the present disclosure installed on a power line assembly and having a first guard cover portion and a second guard cover portion shown as transparent.
Figure 12:
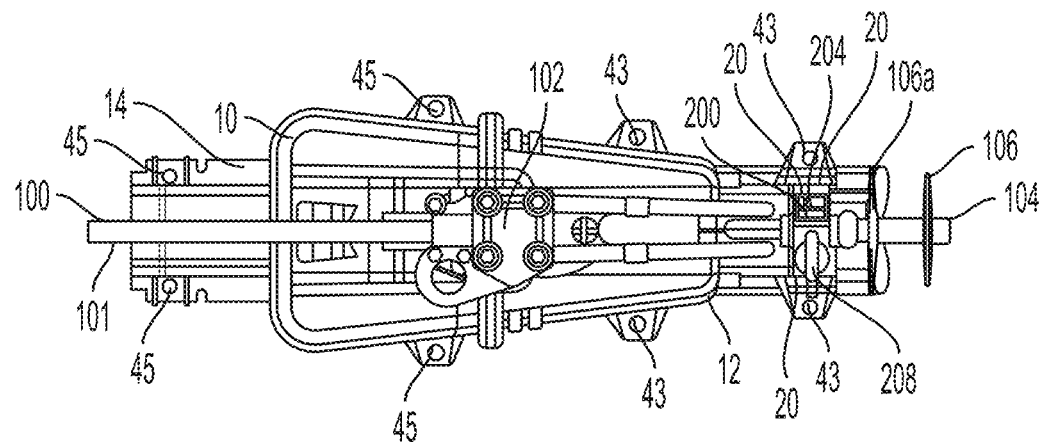
FIG. 12 is a bottom view of the guard assembly of FIG. 1 having the first guard cover portion and the second guard cover portion shown as transparent.

Referring to the drawings and in particular to FIG. 1, an exemplary embodiment of a guard assembly according to the present disclosure is shown and is generally referred to by reference numeral 10. Guard assembly 10 is installed on a deadend of a power line assembly 100. Power line assembly 100 has a conductor 101 that is connected to a deadend clamp 102 that are both energized. Deadend clamp 102 is, for example, a bolted shoe, as shown in FIG. 1, or wedge. Deadend clamp 102 connects conductor 101 to an insulator 104 that has sheds 106. Guard assembly 10 has a first guard cover portion 12, second guard cover portion 14 and a clamp 200. Alternatively, clamp 200 can be used without first guard cover portion 12 and second guard cover portion 14. Another alternative includes first guard cover portion 12 and second guard cover portion 14 that can be a single piece. For example, first guard cover portion 12 and second guard cover portion 14 are not two separate halves but one large guard (totaling the two halves). Although a single guard body that combines first guard cover portion 12 and second guard cover portion 14 is a sound option to provide protection, it can have limitations. A conductor such as conductor 101 exiting a deadend clamp, for example, deadend clamp 102, downward can use either a solid one-piece or a two-piece guard. However, a conductor, such as conductor 101, exiting the deadend clamp, for example, deadend clamp 102, upward can only make use of a two-piece guard, for example, first guard cover portion 12 and second guard cover portion 14. Referring to FIG. 12, first guard cover portion 12 has first loops 43 and second guard cover portion 14 has second loops 45 that are each hot stick loops allowing for hanging above equipment, for example, power line assembly 100, to locate as well as another attachment point to push down into the equipment if necessary/advantageous.

Advantageously, guard assembly 10 has clamp 200 that mounts directly to insulator 104 of a deadend of power line assembly 100. The end user will be required to vertically orient clamp 200 relative to the ground below regardless of the deadend of power line's 100 existing position. Clamp 200 ensures correct placement of first guard cover portion 12 and second guard cover portion 14 as well as providing them with a positive retention to clamp 200 itself.

Figure 2:
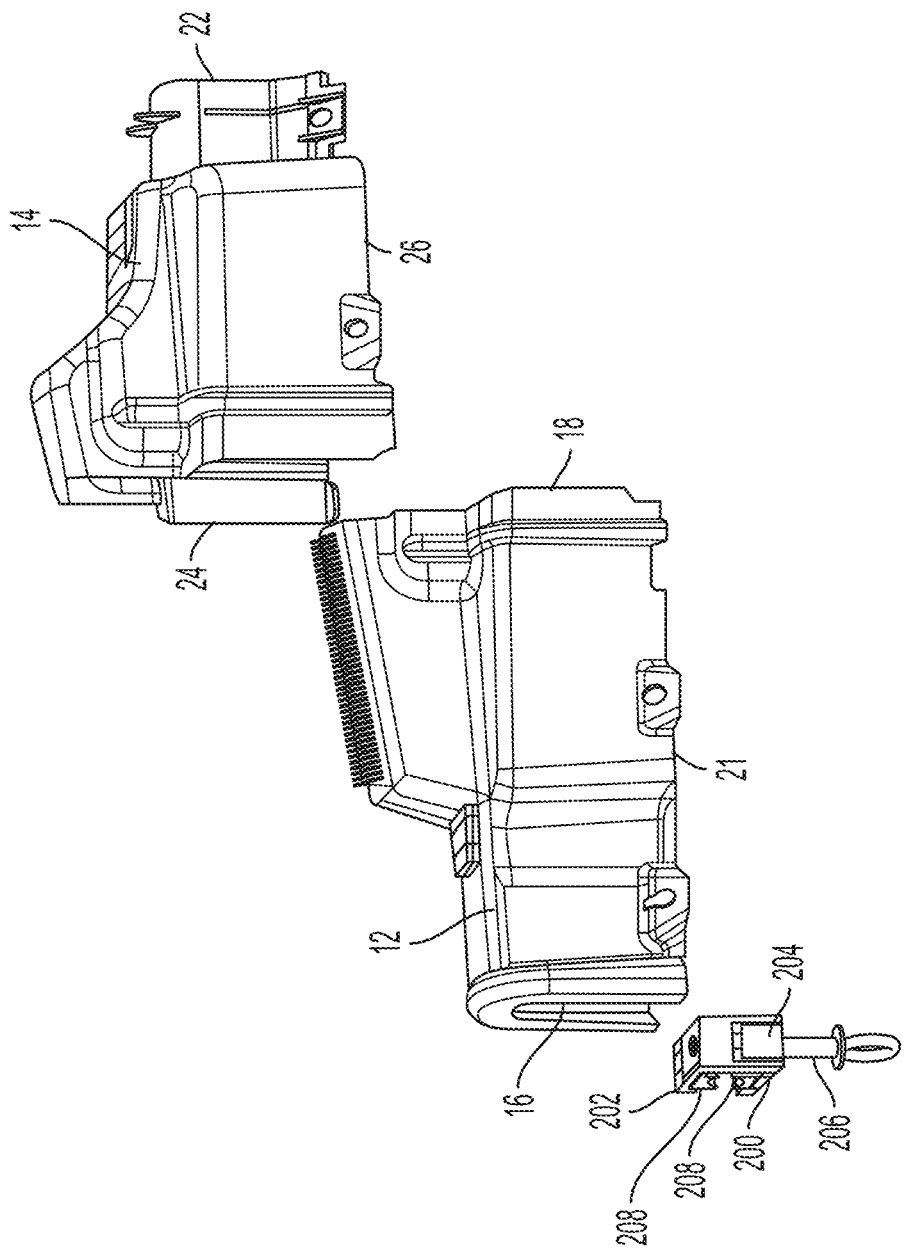
FIG. 2 is a rear, perspective exploded view of the guard assembly of FIG. 1.

Referring to FIG. 2, guard assembly 10 has first guard cover portion 12, second guard cover portion 14 and clamp 200. First guard cover portion 12 is shaped to cover a portion of the deadend of power line assembly 100. First guard cover portion 12 has a first side opening 16, a first middle opening 18 and a first open bottom 21. Second guard cover portion 14 is shaped to cover another portion of the deadend of power line assembly 100. Second guard cover portion 14 has a second side opening 22, a second middle opening 24 and a second open bottom 26. First guard cover portion 12 and second guard cover portion 14 are made of a material, for example, a thermoplastic compound.

Clamp 200 has a fixed jaw 202, a moveable jaw 204, a bolt 206 and two jaw faces 208. Fixed jaw 202 is made of a material, for example, a thermoplastic compound. Moveable jaw 204 is made of a material, for example, a thermoplastic compound. Bolt 206 is made of a material, for example, a thermoplastic compound. Face 208 is made of a material, for example, a thermoplastic compound.

Figure 3:
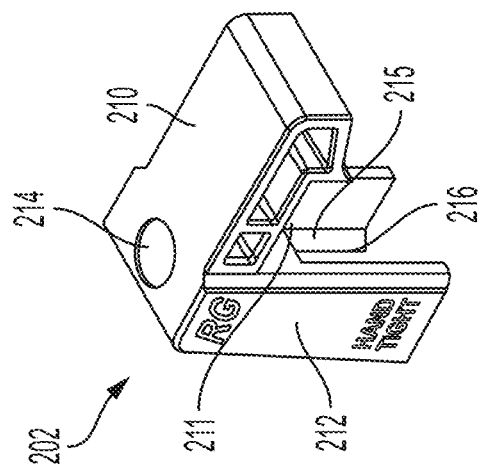
FIG. 3 is a top perspective view of a fixed jaw of a clamp of the guard assembly of FIG. 1.
Figure 9:
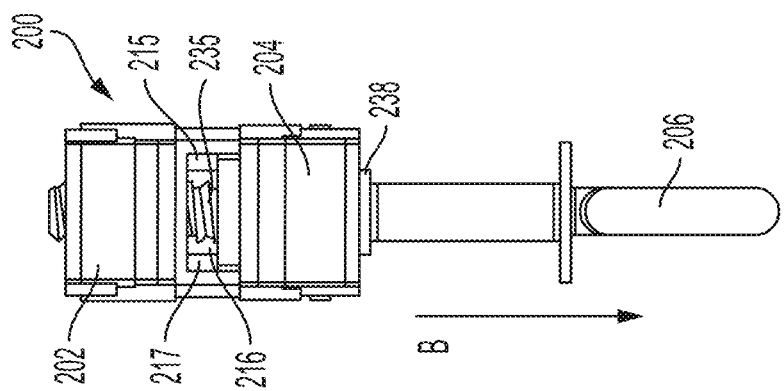
FIG. 9 is a front view of the clamp of the guard assembly of FIG. 1.

Referring to FIG. 3, fixed jaw 202 has a top member 210 and a bottom member 212 forming an inverted L-shape. Top member 210 has an opening 214 that passes through top member 210 and through bottom member 212. Opening 214 can have threads. Top member 210 has a depression 211 shaped to receive jaw face 208. Bottom member 212 has a slot 216 forming edge walls 215, 217 (FIG. 9).

Figure 4:
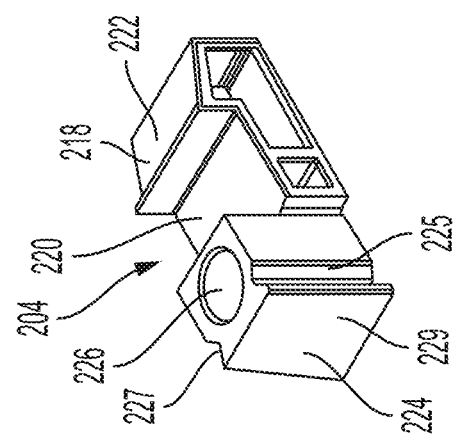
FIG. 4 is a top perspective view of a moveable jaw of the clamp of the guard assembly of FIG. 1.

Referring to FIG. 4, moveable jaw 204 has a jaw body 218. Jaw body 218 has a depression 220 having a protruded side 222 and receiving side 224. Protruded side 222 is shaped to receive jaw face 208. Receiving side 224 has opening 226 so that bolt 206 can pass through moveable jaw 204. Receiving side 224 can be threaded in opening 226. Receiving side 224 has grooves 225, 227 forming a slider 229.

Figure 5:
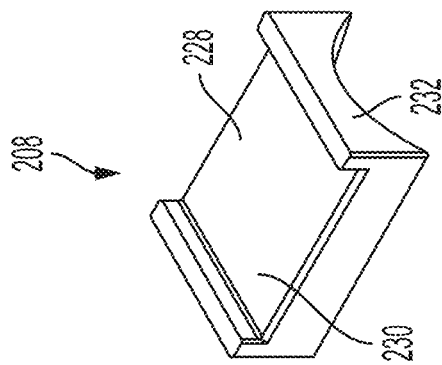
FIG. 5 is a bottom perspective view of a jaw face of the clamp of the guard assembly of FIG. 1.

Referring to FIG. 5, jaw face 208 has a face body 228. Face body 228 has a mating portion 230 that is shaped to be received in depression 211 of fixed jaw 202 or depression 220 of moveable jaw 204. Jaw face 208 has an insulator receiving side 232 that is opposite mating portion 230 that is shaped to clamp insulator 104. Jaw faces 208 can be removable from fixed jaw 202 and moveable jaw 204 and replaced with other jaw faces having different diameters or materials to provide greater or less friction. Jaw faces 208 can have rubberized teeth to assist with gripping insulator 104.

Figure 6:
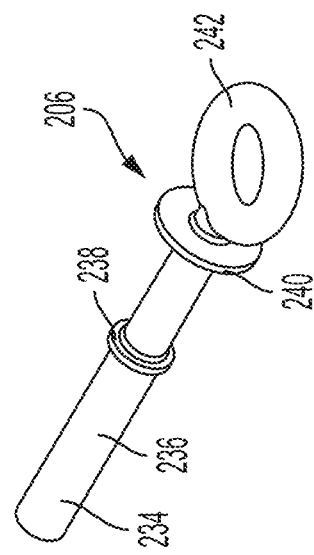
FIG. 6 is a top perspective view of a bolt of the clamp of the guard assembly of FIG. 1.

Referring to FIG. 6, bolt 206 has a bolt body 234. Bolt body 234 has a mating portion 236. Mating portion 236 can have threads 235 as shown in FIG. 9. Bolt body 234 has a stop ridge 238. Bolt body 234 has a loop ridge 240 and loop 242.

Referring to FIGS. 7-10, clamp 200 has two of jaw faces 208. One of jaw faces 208 is connected to moveable jaw 204 in depression 220, for example, by snap fit. The other of jaw faces 208 is connected in depression 211 of fixed jaw 202, for example, by snap fit. Referring to FIG. 9, edge walls 215, 217 of fixed jaw 202 each fit into one of grooves 225, 227 of moveable jaw 204 so that slider 229 extends out of slot 216 on a side of edge walls 215, 217 opposite a side facing jaw faces 208. Slider 229 is sized larger than slot 216 to maintain moveable jaw 204 in slot 216. Mating portion 236 of bolt 206 passes through opening 214 of fixed jaw 202 and through opening 226 of moveable jaw 204. Threads in opening 214 of fixed jaw 202 mate with threads 235 of mating portion 236 of bolt 206. Threads in opening 226 of moveable jaw 204 mate with threads 235 of mating portion 236 of bolt 206. Moveable jaw 204 rests on stop ridge 238.

Figure 8:
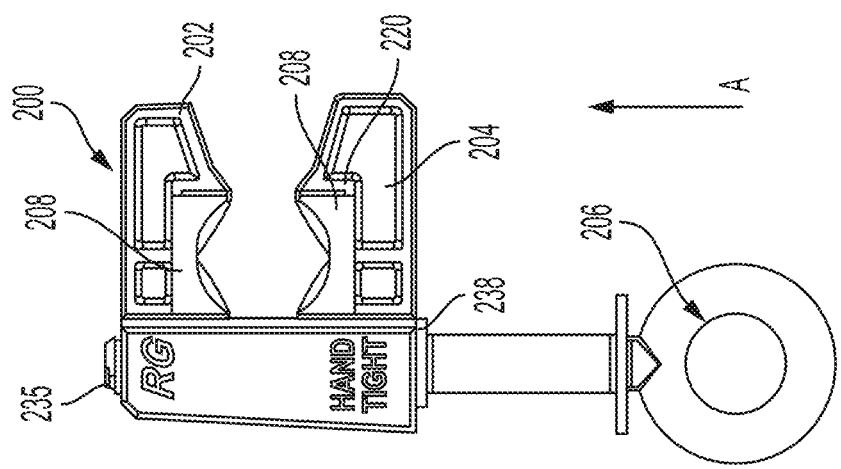
FIG. 8 is a side view of the clamp of the guard assembly of FIG. 1.
Figure 7:
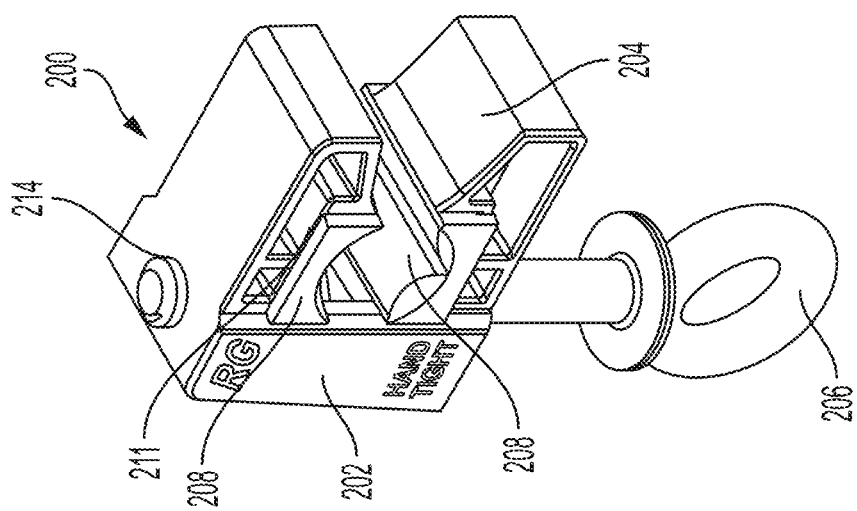
FIG. 7 is a top perspective view of the clamp of the guard assembly of FIG. 1.
Figure 10:
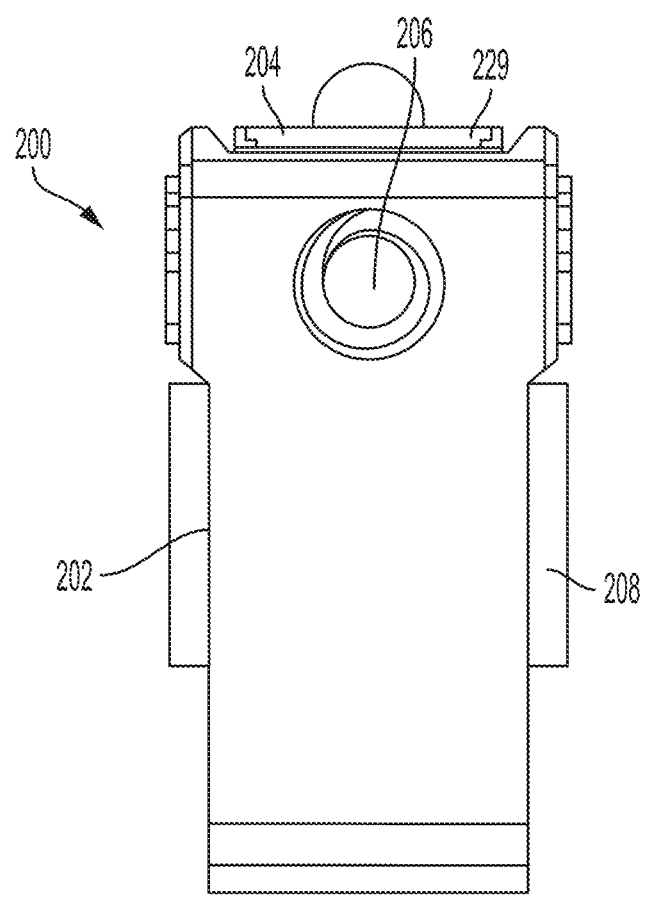
FIG. 10 is a top view of the clamp of the guard assembly of FIG. 1.

In operation, when bolt 206 is rotated in a first direction, bolt 206 moves in a direction A, shown in FIG. 8, so that ridge 238 of bolt 206 moves moveable jaw 204 in direction A to move protruded side 222 of moveable jaw 204 closer to top member 210 of fixed jaw 202 moving two jaw faces 208 closer together. When bolt 206 is rotated in a second direction opposite to the first direction, bolt 206 moves in a direction B, shown in FIG. 9, so that ridge 238 of bolt 206 moves moveable jaw 204 in direction B to move protruded side 222 of moveable jaw 204 away from top member 210 of fixed jaw 202 moving two jaw faces 208 further a part. Slider 229 moves in slot 216 in both the direction A and the direction B when bolt 206 is rotated in either the first direction or the second direction to maintain a connection and alignment between fixed jaw 202 and moveable jaw 204.

Figure 14:
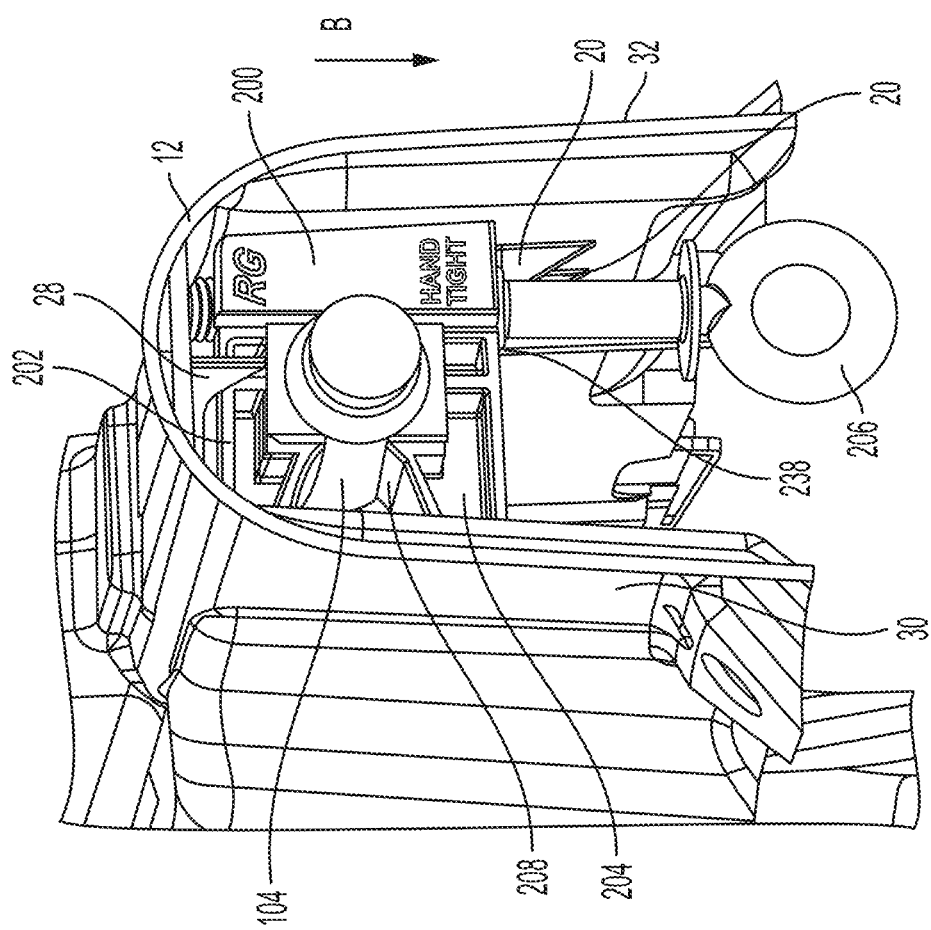
FIG. 14 is an enlarged, partial top perspective view of the guard assembly of FIG. 1.
Figure 15:
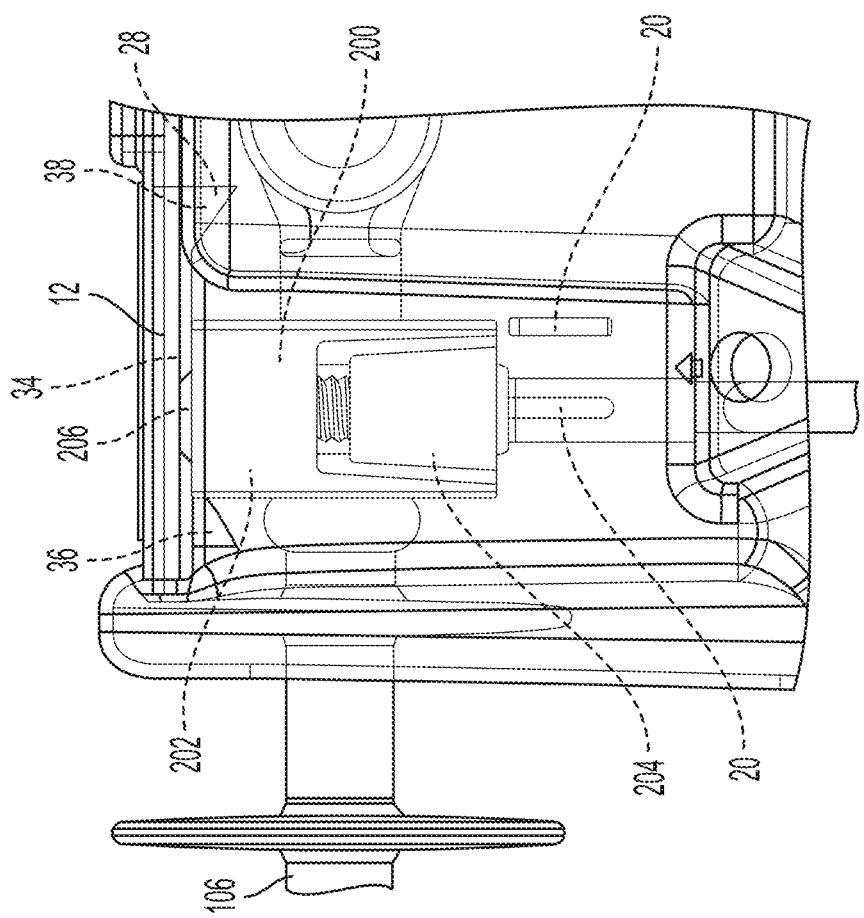
FIG. 15 is an enlarged, partial side view of the guard assembly of FIG. 1.

Referring to FIG. 12, to install guard assembly 10, a lineman can use a hot stick with guard assembly 10. Clamp 200 attaches to insulator 104 and clamp 200 is pivoted to ensure it is tightened in a vertical orientation relative to the ground below despite the equipment position of powerline 100. Clamp 200 is tightened in the vertical orientation on insulator 104 by positioning clamp 200 between a first shed 106a and deadend clamp 102 and placing fixed jaw 202 and moveable jaw 204 around insulator 104 so that bolt 206 is then rotated in the first direction to move bolt 206 in the direction A, shown in FIG. 8, and ridge 238 of bolt 206 moves moveable jaw 204 in direction A to move protruded side 222 of moveable jaw 204 closer to top member 210 of fixed jaw 202 moving two jaw faces 208 closer together connecting clamp 200 to insulator 104. Slider 229 moves in slot 216 in the direction A when bolt 206 is rotated the first direction to maintain the connection and alignment between fixed jaw 202 and moveable jaw 204. The hot stick can be inserted into loop 242 to allow for rotation. Referring to FIG. 14, first guard cover portion 12 is then installed overlapping first shed 106a of insulator 104. Alternatively, first guard cover portion 12 may cover a portion of insulator 104 that does not include first shed 106a. First guard cover portion 12 has four clip portions 20 so that two of four clip portions 20 can be positioned on each side of clamp 200 to clip first guard cover portion 12 onto clamp 200 by snap fit. First guard cover portion 12 is pressed downward in direction B so that each of clip portions 20 that have a slanted surface contacts clamp 200 to move opposite sides 30, 32 of first guard cover portion 12 away from one another deforming first guard cover portion 12 outward over clamp 200 until each of clip portions 20 is below clamp 200 allowing opposite sides of first guard cover portion 12 to move closer together positioning clip portions 20 under clamp 200 to connect first guard cover portion 12 to clamp 200. Once first guard cover portion 12 and clamp 200 are connected, there can be space between clip portions 20 and moveable jaw 204 to allow for limited movement therebetween. Referring to FIGS. 14 and 15, first guard cover portion 12 has an alignment projection 28. Alignment projection 28 has a middle surface 34 and slanted surfaces 36, 38 on opposite sides of middle surface 34. Alignment projection 28 has slanted surfaces 36, 38 that limit horizontal movement of clamp 200 during connection of first guard cover portion 12 to clamp 200 to assist with placement of first guard cover portion 12 on clamp 200 during installation. A space can be formed between middle surface of alignment projection 28 and a portion of bolt 206 that extends out of fixed jaw 202 to allow for movement of bolt 206 relative to fixed jaw 202 to move moveable jaw 204. Second guard cover portion 14 then overlaps and clips by snap fit into first guard cover portion 12. Alternatively, there can be different versions of second guard cover portion 14 which will overlap and clip by snap fit into first guard cover portion 12 depending on a configuration of power line assembly 100.

Figure 11:
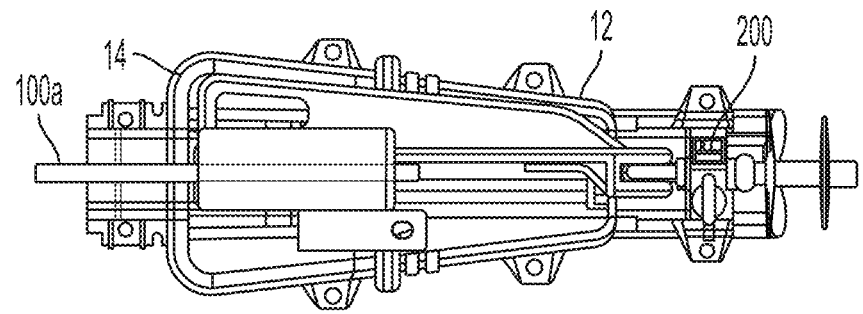
FIG. 11 is a bottom view of the guard assembly of FIG. 1 installed on a power line that is modified from FIG. 1 and having the first guard cover portion and the second guard cover portion shown as transparent.
Figure 13:
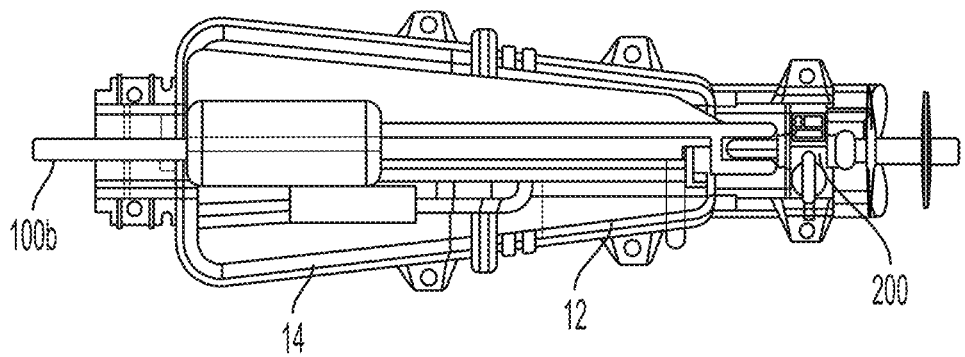
FIG. 13 is a bottom view of the guard assembly of FIG. 1 installed on a power line that is modified from FIG. 1 and having the first guard cover portion and the second guard cover portion shown as transparent.

Referring to FIG. 11, guard assembly 10 can accommodate a modified power line assembly 100a that is a wedge assembly. Referring to FIG. 13, guard assembly 10 can accommodate a modified power line assembly 100b that is another wedge assembly.

Guard assembly 10 is now a 3-component assembly that accommodates a wide range of equipment while ensuring proper coverage. Clamp 200 attaches to insulator 104 just before deadend clamp 102 or other deadend clamp, shoe or wedge assembly. Guard assembly 10 has a user friendly installation and removal that mimics existing work methods of a typical hot line clamp. Clamp 200 features jaw faces 208 that allow for various diameters of insulators 104 while providing a secure grip.

Clamp 200 mimics the action of a typical hot line clamp. Clamp 200 is a vise clamp style device of a polymer makeup that will clamp to the end of a deadend insulator 104 just before deadend clamp 102. This allows for the end user to tighten clamp 200 in a vertical orientation ensuring proper guard coverage. Guard assembly 10 will mount overtop of clamp 200 snapping into place via internal snap hooks on first guard cover portion 12. This design came about after realizing too many variables existed with deadend clamps, for example, shoes and wedges, to create a universal guard. The most consistent element was insulator 104, but it did not provide a solid feature to ensure vertical orientation (due to cylindrical profile). Guard assembly 10 having clamp 200 provides ensures this vertical orientation.

Figure 17:
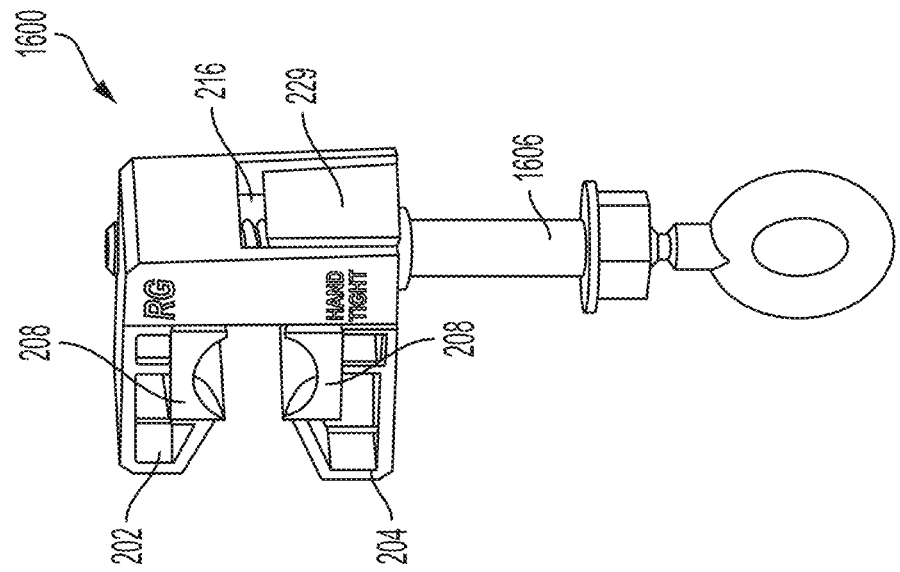
FIG. 17 is a rear, top perspective view of the clamp of FIG. 16.
Figure 16:
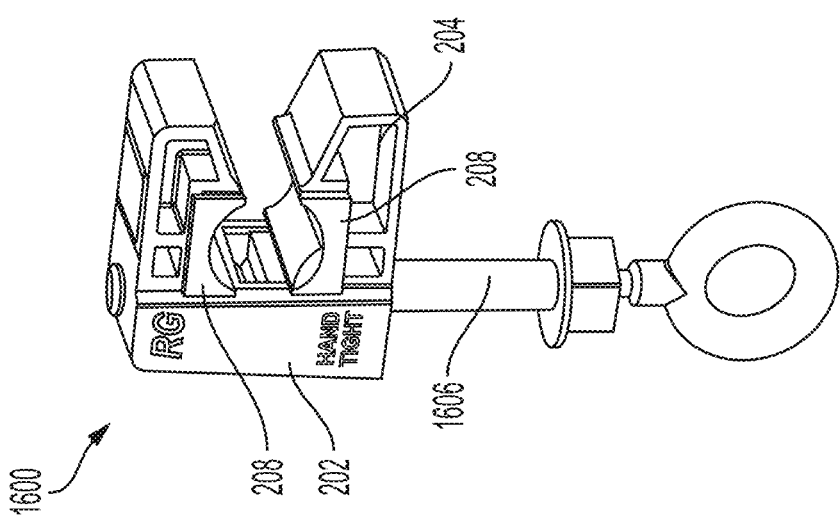
FIG. 16 is a front, top perspective view of the clamp of the guard assembly of FIG. 1 that is modified to include a torque bolt.
Figure 18:
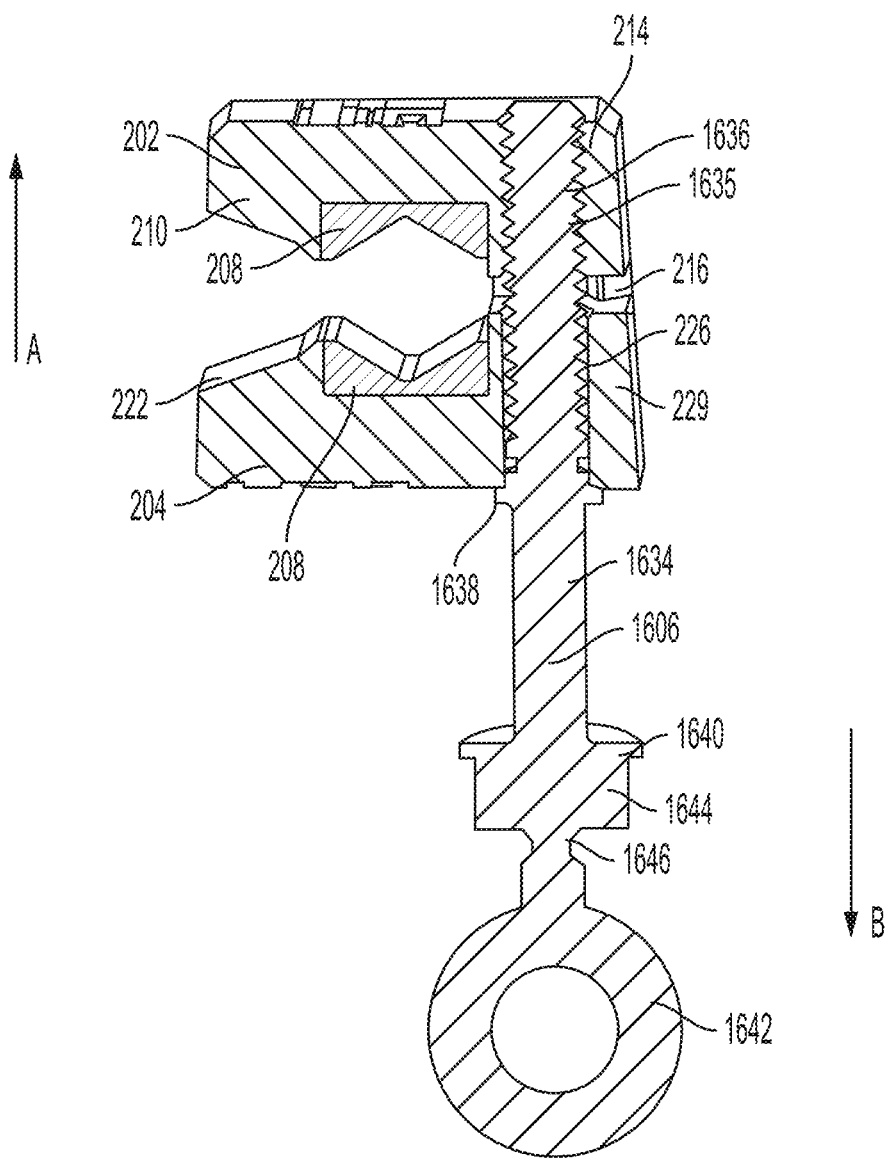
FIG. 18 is a rear side cross sectional view of the clamp of FIG. 16.
Figure 21:
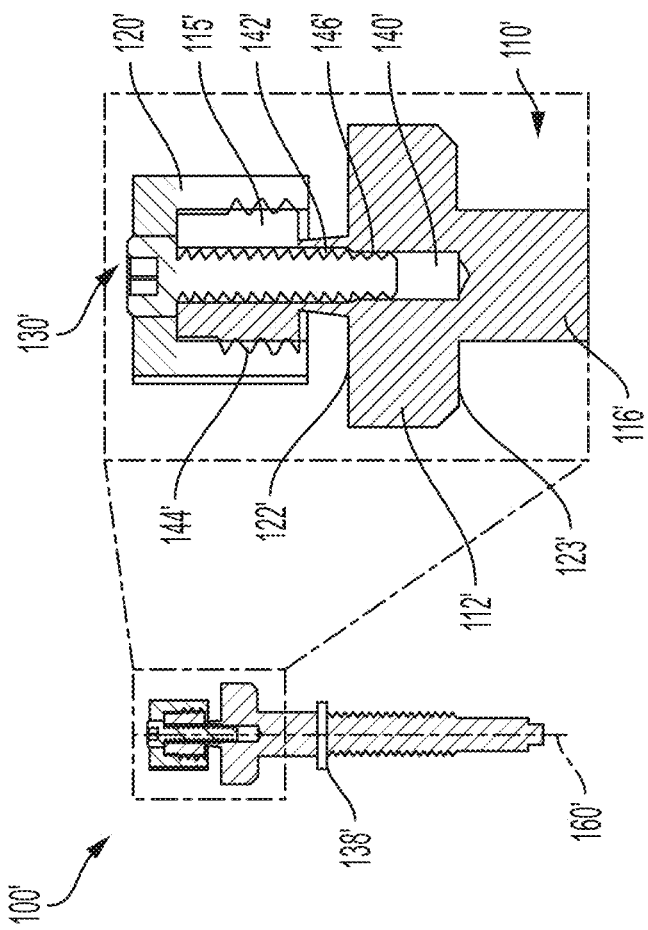
FIG. 21 is a cross-section view of the example captive shear bolt assembly shown in FIG. 20.
Figure 20:
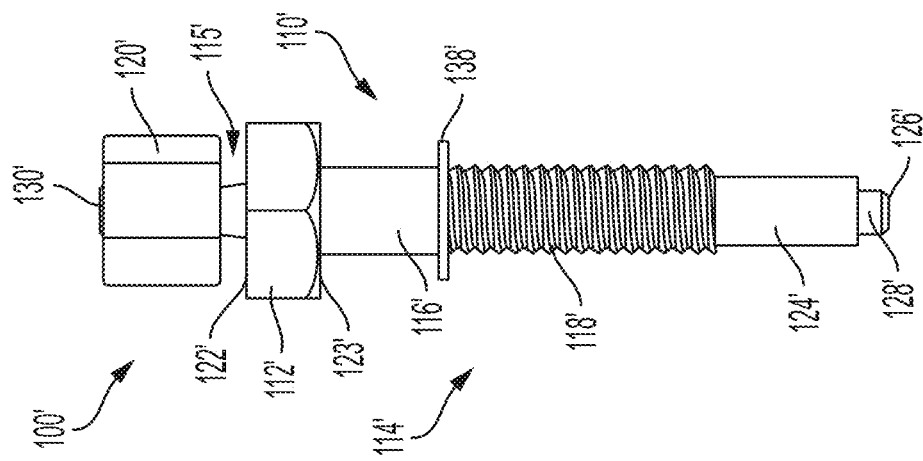
FIG. 20 is an example captive shear bolt assembly.
Figure 22:
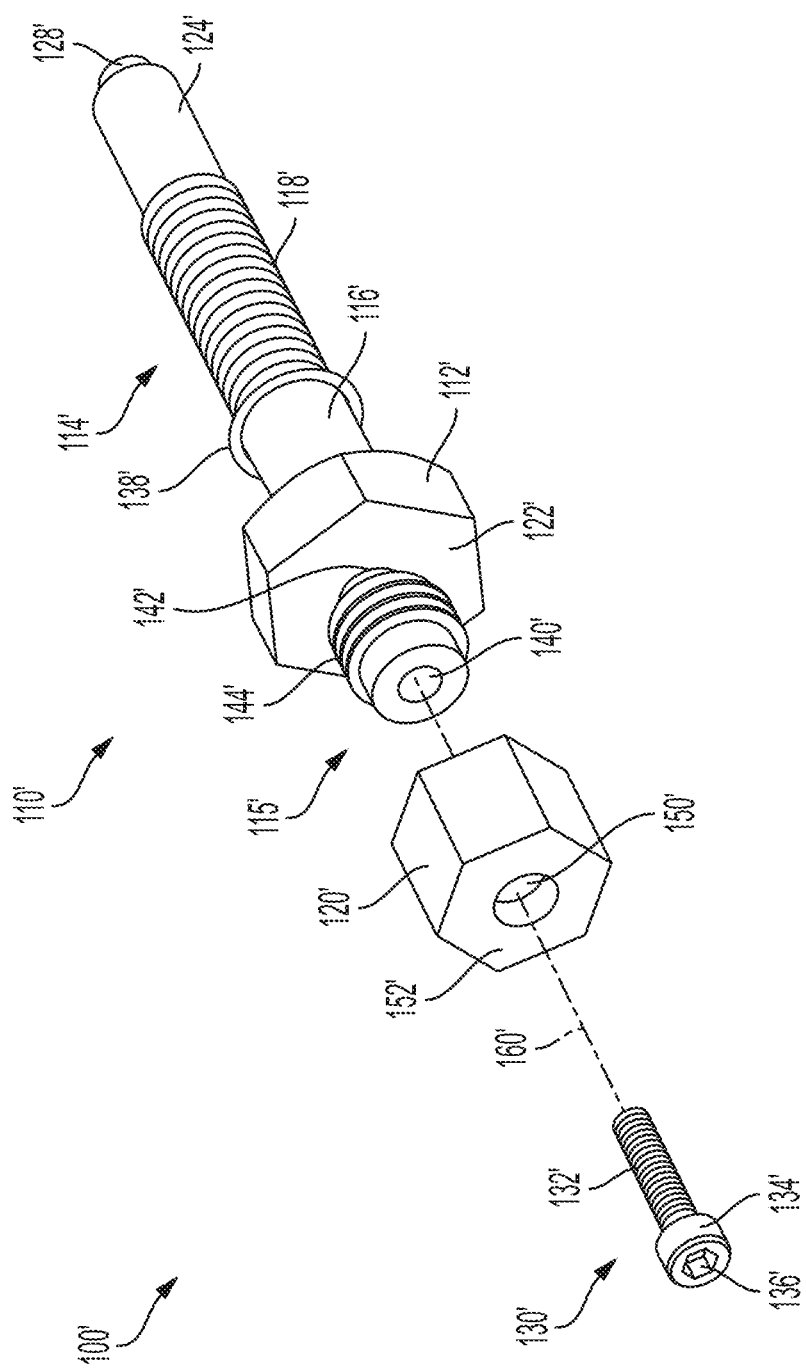
FIGS. 22 and 23 are exploded views of the example captive shear bolt assembly shown in FIG. 20.
Figure 23:
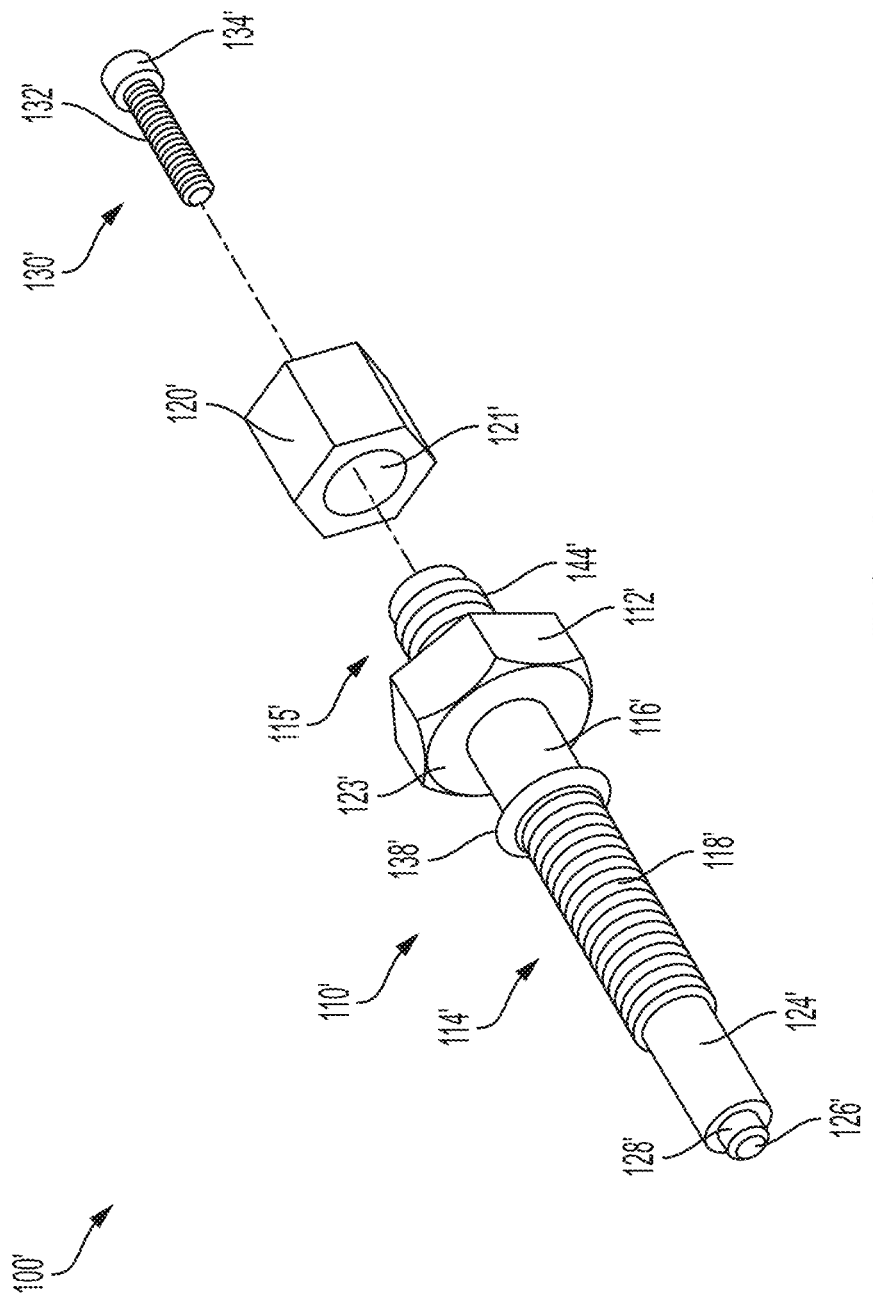

Referring to FIGS. 16 and 17, clamp 200 can be modified to clamp 1600. Clamp 1600 is the same as clamp 200 except clamp 1600 includes torque bolt 1606 instead of bolt 206, and, accordingly, the features that are the same for clamp 200 and clamp 1600 use the same reference numerals. Referring to FIG. 18, torque bolt 1606 has a bolt body 1634. Bolt body 1634 has a mating portion 1636. Mating portion 1636 can have threads 1635. Bolt body 1634 has a stop ridge 1638. Bolt body 1634 has a loop ridge 1640 and loop 1642. A hex head 1644 is below loop ridge 1640. A necked down area 1646 is just above loop 1642 and below hex head 1644. Torque bolt 1606 is made of a material, for example, a thermoplastic compound, aluminum, aluminum alloy and any combination thereof.

Mating portion 1636 of bolt 1606 passes through opening 214 of fixed jaw 202 and through opening 226 of moveable jaw 204. Threads in opening 214 of fixed jaw 202 mate with threads 1635 of mating portion 1636 of bolt 1606. Threads in opening 226 of moveable jaw 204 mate with threads 1635 of mating portion 1636 of bolt 206. Moveable jaw 204 rests on stop ridge 1638.

Referring to FIGS. 18 and 19, during operation, to install clamp 1600, a lineman can use a hot stick 1900. Clamp 1600 attaches to insulator 104 and clamp 1600 is pivoted to ensure it is tightened in a vertical orientation relative to the ground below despite the equipment position of powerline 100. Clamp 1600 is tightened in the vertical orientation on insulator 104 by positioning clamp 1600 between first shed 106a and deadend clamp 102 and placing fixed jaw 202 and moveable jaw 204 around insulator 104 so that torque bolt 1606 is then rotated in the first direction to move bolt 1606 in the direction A, shown in FIG. 18, and ridge 1638 of bolt 1606 moves moveable jaw 204 in direction A to move protruded side 222 of moveable jaw 204 closer to top member 210 of fixed jaw 202 moving two jaw faces 208 closer together connecting clamp 1600 to insulator 104. Slider 229 moves in slot 216 in the direction A when bolt 206 is rotated the first direction to maintain the connection and alignment between fixed jaw 202 and moveable jaw 204. The hot stick can be inserted into loop 1642 to allow for rotation. Once a predetermined amount of tension is applied to clamp 1600, then torque bolt 1606 breaks along necked down area 1646 so that loop 1642 is disconnected from hex head 1644. This will ensure adequate tension is applied to the overall clamp as well as eliminate risk of overtightening. Hex head 1644 is included as backup to allow for clamp 1600 to be removed once loop 1642 has been sheared off by rotating hex head 1644 to move torque bolt 1606 in the second direction opposite to the first direction, to move bolt 1606 in direction B, shown in FIG. 18, so that ridge 1638 of bolt 1606 moves moveable jaw 204 in direction B to move protruded side 222 of moveable jaw 204 away from top member 210 of fixed jaw 202 moving two jaw faces 208 further a part. Clamp 1600 connects to first guard cover portion 12 in the same way as clamp 200 connects to first guard cover portion 12. Second guard cover portion 14 can then be connected to first guard cover portion 12 as described herein. Similar to clamp 200, clamp 1600 can be used without first guard cover portion 12 and second guard cover portion 14 or first guard cover portion 12 and second guard cover portion 14 that can be a single piece.

Two jaw faces 208 can be a material that has a 80 shore A hardness. Fixed jaw 202 and moveable jaw 204 can be made of, for example, glass filled acetal or glass filled polybutylene terephthalate.

Clamp 1600 that includes torque bolt 1606 thus provides adequate tension to be applied to the overall clamp 1600 as well as eliminates risk of overtightening. Hex head 1644 also provides a backup to allow for clamp 1600 to be removed once loop 1642 has been sheared off.

FIGS. 20-23 depict an example captive shear bolt assembly 100' that can be used with clamp 1600 instead of torque bolt 1606 in a modified clamp 1600. Accordingly, the modified clamp 1600 is the same as clamp 1600 that is not modified except uses captive shear bolt assembly 100' instead of torque bolt 1606. Captive shear bolt assembly 100' is the same as captive shear bolt assembly 100 of U.S. patent application Ser. No. 16/582,532 filed Sep. 25, 2019 that is hereby incorporated by reference except captive shear bolt assembly 100' adds a stop ridge 138' for moveable jaw 204 to rest on. Stop ridge 138' is the same as stop ridge 1638 of torque bolt 1606.

The example captive shear bolt assembly 100' may include a bolt 110', a cap nut 120', and a screw 130'. The bolt 110' may include a head 112', a shank 114', and a stud 115'. The head 112' may be hexagonal. The head 112' may define a top surface 122' and a bottom surface 123'. The stud 115' may extend from the top surface 122'. The shank 114' may extend from the bottom surface 123'. The shank 114' may include a shoulder 116', a threaded portion 118', a non-threaded portion 124', and a protrusion 128'. The shoulder 116' may be between the bottom surface 123' of the head 112' and the threaded portion 118'. The threaded portion 118' may be between the shoulder 116' and the non-threaded portion 124'. The non-threaded portion 124' may have a first cross-sectional area that is less than or equal to a minor diameter of the threaded portion 118'. The protrusion 128' may define the distal end 126' of the shank 114'. The protrusion 128' may have a second cross sectional area that is less than the first cross sectional area of the threaded portion 118'. The protrusion 128' may be configured to accept a lock washer or a retaining ring. For example, a retaining ring may be radially or axially installed onto the protrusion 128'.

The bolt 110' may define a cavity 140'. The cavity 140' may be located (e.g., centered) at an axis of rotation 160' of the bolt 110'. The cavity 140' may extend through the stud 115' and the head 112'. The cavity 140' may extend partially into the shank 114'. The cavity 140' may be configured to receive the screw 130'. For example, the cavity 140' may include internal threads 146'. The internal threads 146' of the cavity 140' may begin after the shear section 142'.

The stud 115' may be threaded. For example, the stud 115' may include external threads 144'. The stud 115' may define a shear section 142'. The shear section 142' may be between the top surface 122' of the head 112' and the external threads 144'. The shear section 142' may define a tapered cross section with a first diameter at the top surface 122' of the head 112' and a second diameter at a start of the external threads 144'. The first diameter may be greater than the second diameter. The shear section 142' may be configured to shear at or above a threshold torque. For example, the second diameter may be determined based on the threshold torque.

The cap nut 120' may be hexagonal (e.g., a hexagonal cap nut). The cap nut 120' may define an orifice 150' on the top surface 152' of the cap nut 120'. The orifice 150' may be configured to receive the screw 130'. For example, the orifice may receive one or more threads 132' of the screw 130' and/or a head 134' of the screw 130'. The cap nut 120' may include internal threads that allow the cap nut 120' to be threaded onto the stud 115'. When the cap nut 120' is threaded onto the stud 115', the orifice 150' may be aligned with the cavity 140' such that the screw 130' may be installed in the cavity 140' through the orifice 150'.

The screw 130' may include threads 132' and a head 134'. The head 134' may define a recessed drive hole 136'. The recessed drive hole 136' may be configured to receive a hexagonal (e.g., such as an Allen wrench) drive.

The cap nut 120' may be threaded onto the bolt 110'. For example, the cap nut 120' may be threaded onto the external threads 144' of the stud 115'. The screw 130' may be inserted into the cavity 140' via the orifice 150'. The captive shear bolt assembly 100' may be configured to be driven at the cap nut 120'. As torque is applied to the cap nut 120', the captive shear bolt assembly 100' may rotate as the threaded portion 118' engages complementary threads, namely, threads in opening 214 of fixed jaw 202 and threads in opening 226 of moveable jaw 204 so that when fixed jaw 202 and moveable jaw 204 are placed around insulator 104, captive shear bolt assembly 100' is then rotated in the first direction to move captive shear bolt assembly 100' in the direction A, shown in FIG. 18, and stop ridge 138' of captive shear bolt assembly 100' moves moveable jaw 204 in direction A to move protruded side 222 of moveable jaw 204 closer to top member 210 of fixed jaw 202 moving two jaw faces 208 closer together connecting the modified clamp 1600 to insulator 104. When the applied torque exceeds a threshold torque, the shear section 142' of the stud 115' may shear such that the cap nut 120' and the stud 115' are mechanically decoupled from the threaded portion 118' of the bolt. For example, when the shear section 142' shears, the cap nut 120' may no longer drive the threaded portion 118' of the bolt 110'. When the shear section 142' of the stud 115' shears, the screw 130' may captively secure the cap nut 120' and the stud 115' to the bolt 110'. For example, the screw 130' may engage threads in the head 112' portion of the cavity 140'. Similar to torque bolt 1606, once a predetermined amount of tension is applied to the modified clamp 1600, then captive shear bolt assembly 100' breaks along shear section 142'. This will ensure adequate tension is applied to the overall clamp 1600 as well as eliminate risk of overtightening.

Figure 26:
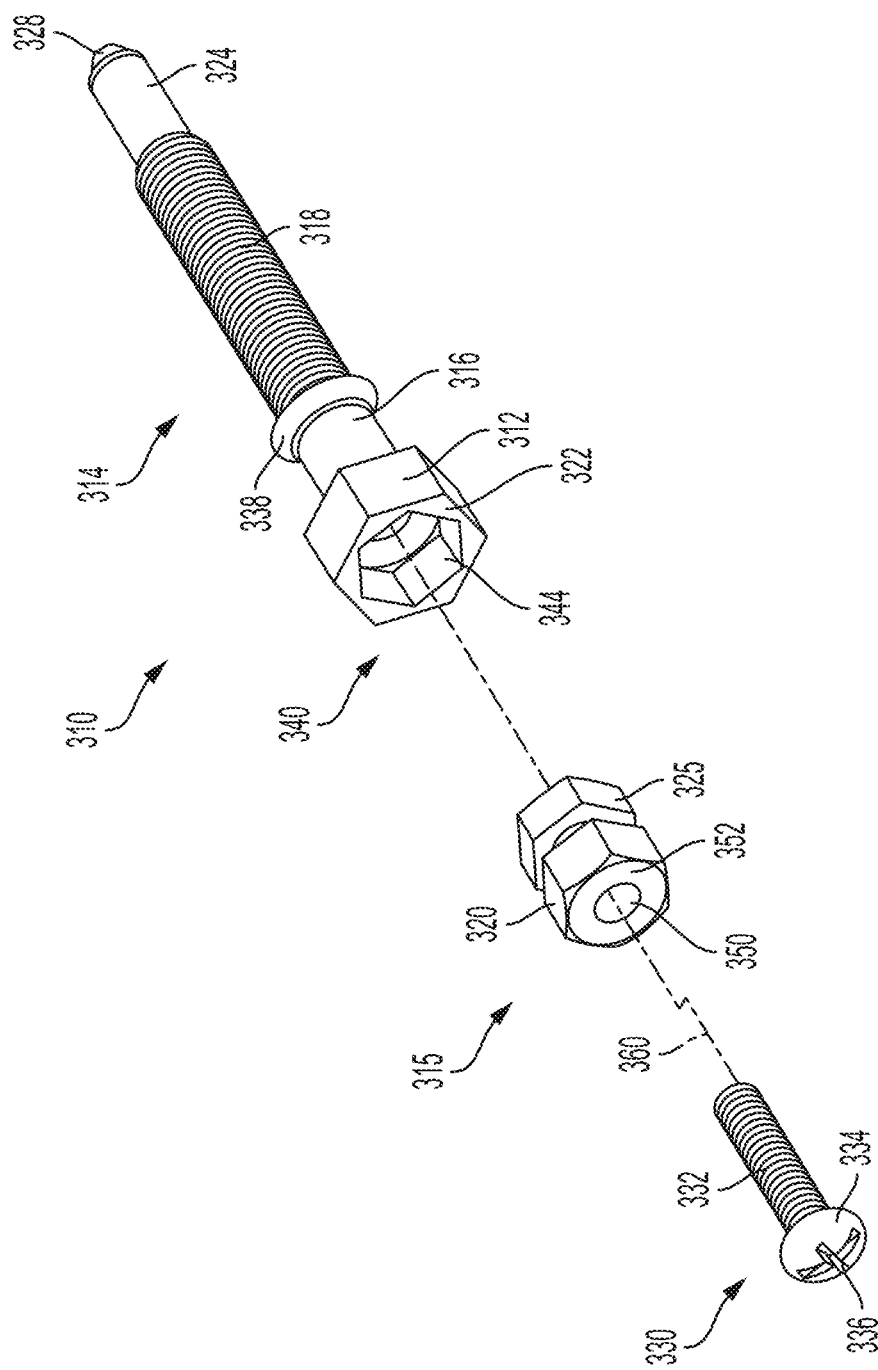
FIG. 26 is an exploded view of the example captive shear bolt assembly shown in FIG. 24.

FIGS. 24-26 depict another example of a captive shear bolt assembly 300 that can be used with clamp 1600 instead of torque bolt 1606 in a modified clamp 1600. Accordingly, the modified clamp 1600 is the same as clamp 1600 that is not modified except uses captive shear bolt assembly 300 instead of torque bolt 1606. Captive shear bolt assembly 300 is the same as captive shear bolt assembly 300 of U.S. patent application Ser. No. 16/582,532 filed Sep. 25, 2019 that is hereby incorporated by reference except captive shear bolt assembly 300 adds a stop ridge 338 for moveable jaw 204 to rest on. Stop ridge 338 is the same as stop ridge 1638 of torque bolt 1606.

The example captive shear bolt assembly 300 may include a bolt 310, a shear coupling 315, and a screw 330. The bolt 310 may include a head 312 and a shank 314. The head 312 may be hexagonal. The head 312 may define a top surface 322 and a bottom surface 323. The shank 314 may extend from the bottom surface 323. The shank 314 may include a shoulder 316, a threaded portion 318, a non-threaded portion 324, and a protrusion 328. The shoulder 316 may be between the bottom surface 323 of the head 312 and the threaded portion 318. The threaded portion 318 may be between the shoulder 316 and the non-threaded portion 324. The non-threaded portion 324 may have a first cross-sectional area that is less than or equal to a minor diameter of the threaded portion 318. The protrusion 328 may define the distal end 326 of the shank 314. The protrusion 328 may have a second cross sectional area that is less than the first cross sectional area of the threaded portion 318. The protrusion 328 may be tapered from the shank 314 to the distal end 326. The protrusion 328 may be configured to accept a retainer (e.g., such as a retaining ring and/or a lock washer).

The shear coupling 315 may define an upper head 320, a lower head 325, and a shear section 342. The upper head 320 and/or the lower head 325 may be hexagonal-shaped. For example, the upper head 320 may be a first hexagonal nut and the lower head 325 may be a second hexagonal nut. The upper head 320 and the lower head 325 may be connected by the shear section 342. The upper head 320 may be configured to receive an external torque. The shear section 342 may define a tapered cross section with a first diameter at the upper head 320 and a second diameter at the lower head 325. The first diameter may be greater than the second diameter. The shear section 342 may be configured to shear at or above a threshold torque. For example, one or more of the second diameter, the material, and/or the thickness of the shear section 342 may be determined based on the threshold torque.

The shear coupling 315 may define an orifice 350. The orifice 350 may extend through the upper head 320, the shear section 342, and the lower head 325. For example, the orifice 350 may start at a top surface 352 of the upper head 320 and may terminate at a bottom surface 354 of the lower head 325. The orifice 350 may be configured to receive the screw 330. For example, the orifice may receive one or more threads 332 of the screw 330 and/or a head 334 of the screw 330.

The bolt 310 may define a cavity 340. The cavity 340 may be located (e.g., centered) at an axis of rotation 360 of the bolt 310. The cavity 340 may extend through the head 312. The cavity 340 may extend partially into the shank 314. The cavity 340 may define a top portion 344 and a bottom portion 348. The top portion 344 may be hexagon-shaped. For example, the top portion 344 may be configured to receive the lower head 325 of the shear coupling 315. The top portion 344 may be configured such that a torque applied to the shear coupling 315 (e.g., the upper head 320 of the shear coupling 315) is transferred to the bolt 310. The cavity 340 may be configured to receive the screw 330. For example, the cavity 340 may include internal threads 346 (e.g., female threads). The internal threads 346 of the cavity 340 may begin after the shear section 342. When the shear coupling 315 is inserted into the head 312, the orifice 350 may be aligned with the cavity 340 such that the screw 330 may be installed in the cavity 340 through the orifice 350.

The screw 330 may include threads 332 and a head 334. The head 334 may define a drive recess 336. The head 334 may be a Phillips (e.g., crosshead) screw head. For example, the drive recess 336 may be configured to receive a Phillips-head drive. Although, the drive recess 336, as shown, may be configured to receive a Phillips-head drive, the head 334 may be configured to receive another type of drive. For example, the head 334 may be configured to receive a flat head drive, a Torx drive, a square drive, a hex socket drive, etc.

The shear coupling 315 may be inserted into the cavity 340. For example, the lower head 325 of the shear coupling 315 may be inserted into the top portion 344 of the cavity 340. The screw 330 may be inserted into the cavity 340 via the orifice 350 in the shear coupling 315. The threads 332 of the screw 330 may engage internal threads 346 in the bottom portion 348 of the cavity 340. The captive shear bolt assembly 300 may be configured to be driven at the shear coupling 315, for example, the upper head 320 of the shear coupling 315. As torque is applied to the upper head 320, the captive shear bolt assembly 300 may rotate as the threaded portion 318 engages complementary threads, namely, threads in opening 214 of fixed jaw 202 and threads in opening 226 of moveable jaw 204 so that when fixed jaw 202 and moveable jaw 204 are placed around insulator 104, captive shear bolt assembly 300 is then rotated in the first direction to move captive shear bolt assembly 300 in the direction A, shown in FIG. 18, and stop ridge 338 of captive shear bolt assembly 300 moves moveable jaw 204 in direction A to move protruded side 222 of moveable jaw 204 closer to top member 210 of fixed jaw 202 moving two jaw faces 208 closer together connecting the modified clamp 1600 to insulator 104. When the applied torque exceeds a threshold torque, the shear section 342 of the shear coupling 315 may shear such that the upper head 320 is mechanically decoupled from the threaded portion 318 of the bolt 310. For example, when the shear section 342 shears, the upper head 320 may no longer drive the threaded portion 318 of the bolt 310. When the shear section 342 of the shear coupling 315 shears, the screw 330 may captively secure the upper head 320 to the bolt 310. For example, the screw 330 may engage the internal threads 346 in the bottom portion 348 of the cavity 340 such that the shear coupling 315 remains coupled to the bolt 310 when the shear section 342 has sheared. Similar to torque bolt 1606, once a predetermined amount of tension is applied to the modified clamp 1600, then captive shear bolt assembly 300 breaks along shear section 342. This will ensure adequate tension is applied to the overall clamp 1600 as well as eliminate risk of overtightening.

The captive shear bold assembly 300 may be configured to be reused. For example, when the shear section 342 has sheared, the screw 330 may be removed such that the shear coupling 315 may be removed. A replacement shear coupling may be installed such that the captive shear bolt assembly 300 can be reused.

Figure 28:
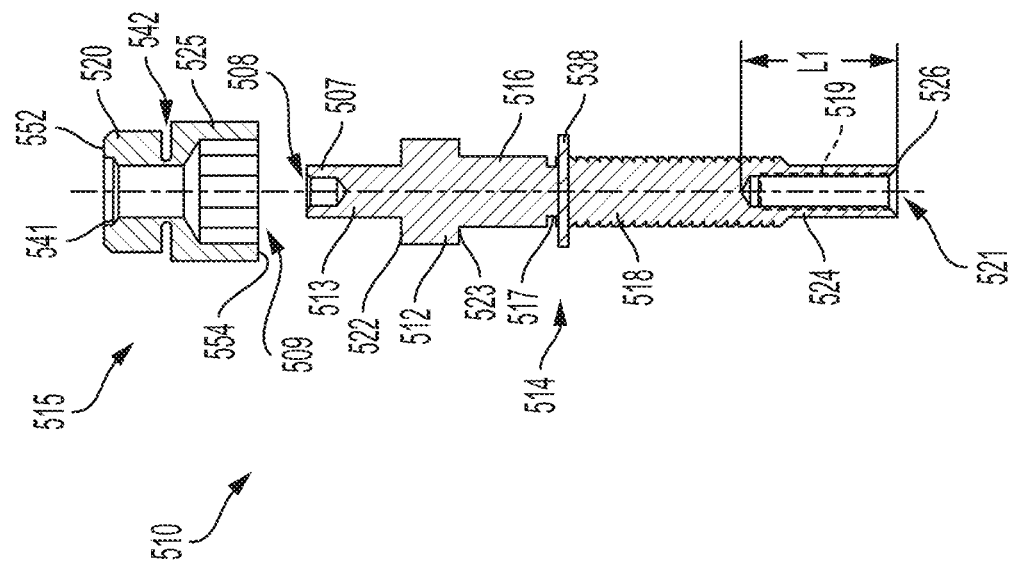
FIG. 28 is a cross-section view of the example captive shear bolt assembly shown in FIG. 27.
Figure 27:
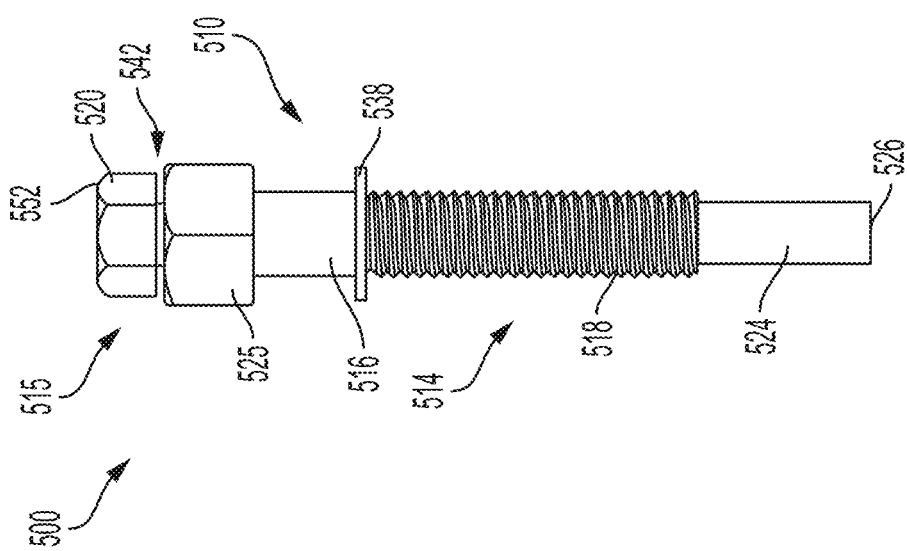
FIG. 27 is another example captive shear bolt assembly.
Figure 29:
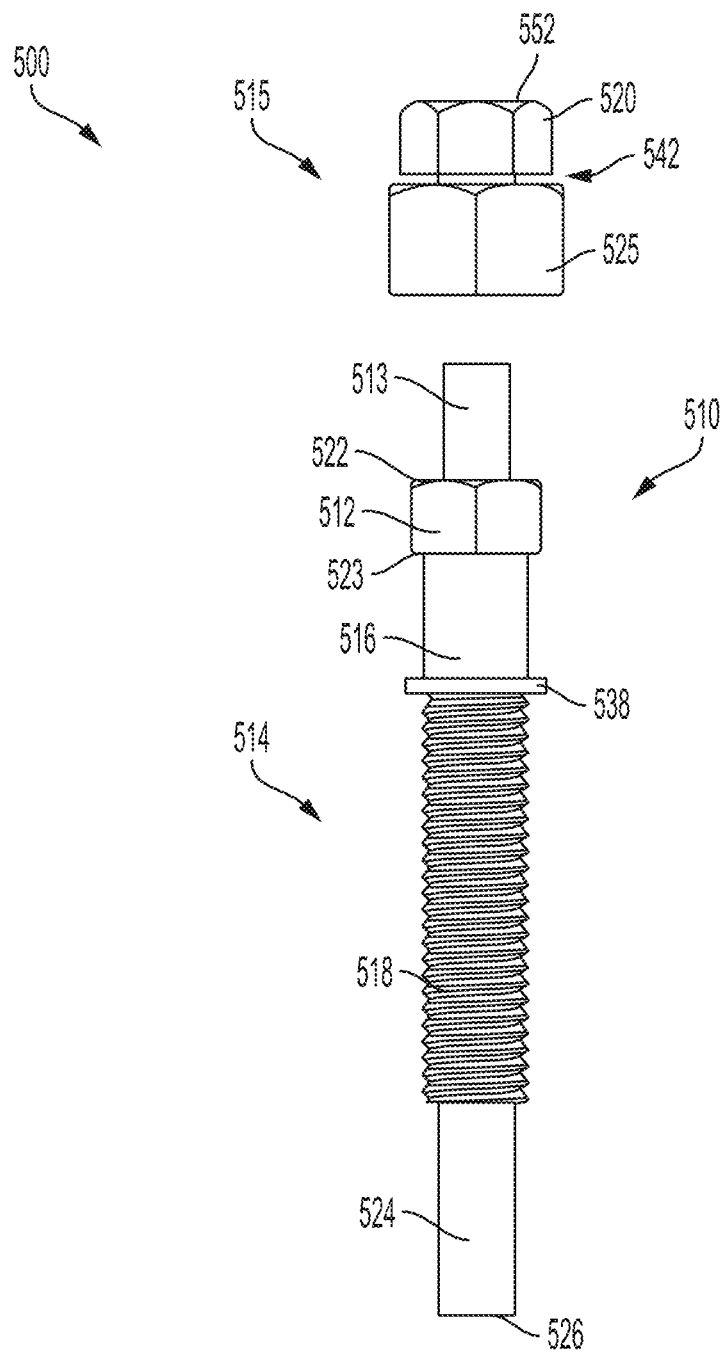
FIG. 29 is an exploded view of the example captive shear bolt assembly shown in FIG. 27.

FIGS. 27-29 depict another example of a captive shear bolt assembly 500 that can be used with clamp 1600 instead of torque bolt 1606 in a modified clamp 1600. Accordingly, the modified clamp 1600 is the same as clamp 1600 that is not modified except uses captive shear bolt assembly 500 instead of torque bolt 1606. Captive shear bolt assembly 500 is the same as captive shear bolt assembly 500 of U.S. patent application Ser. No. 16/582,532 filed Sep. 25, 2019 that is hereby incorporated by reference except captive shear bolt assembly 500 adds a stop ridge 538 for moveable jaw 204 to rest on. Stop ridge 538 is the same as stop ridge 1638 of torque bolt 1606.

The example captive shear bolt assembly 500 may include a bolt 510 and a shear coupling 515. The bolt 510 may include a head 512, an extension 513, and a shank 514. The head 512 may be hexagonal, for example. The head 512 may define a top surface 522 and a bottom surface 523. The extension 513 may be cylindrically-shaped, as shown. The top surface 522 may be cylindrical, hexagonal, or some other shape. The extension 513 may define a cavity 508. The shank 514 may extend from the bottom surface 523. The shank 514 may include a shoulder 516, a threaded portion 518, and a non-threaded portion 524. The shoulder 516 may be between the bottom surface 523 of the head 512 and the threaded portion 518. The shank 514 may define a groove 517 between the shoulder 516 and the threaded portion 518. The groove 517 may be configured such that the bolt 510 is retained within a tap connector, as described herein. For example, the groove 517 may be configured to receive a retaining ring (not shown). The threaded portion 518 may be located between the shoulder 516 and the non-threaded portion 524. The non-threaded portion 524 may have a cross-sectional area that is less than or equal to a minor diameter of the threaded portion 518. The non-threaded portion 524 may be configured to receive a fastener. For example, the shank 514 may define a cavity 521. The cavity 521 may extend a distance L1 from a distal end 526 of the non-threaded portion 524 into the shank 514 and may include internal threads 519. The cavity 521 and the internal threads 519 may begin at a distal end 526 of the non-threaded portion 524. The cavity 521 and/or the internal threads 519 may extend into the non-threaded portion 524 and the threaded portion 518 of the shank 514.

The shear coupling 515 may define an upper head 520, a lower head 525, and a shear section 542. The upper head 520 and/or the lower head 525 may be hexagonal-shaped. For example, the upper head 520 may be a first hexagonal nut and the lower head 525 may be a second hexagonal nut. The upper head 520 and the lower head 525 may be connected by the shear section 542. The upper head 520 may be configured to receive an external torque. The shear coupling may be configured to transfer the external torque to the bolt 510 such that the bolt 510 rotates around its rotational axis when the external torque is applied to the upper head 520. The shear section 542 may define a tapered cross section with a first diameter at the upper head 520, a second diameter at the lower head 525, and a third diameter at a midpoint between the upper head 520 and the lower head 525. The first diameter and the second diameter may be equal. The shear section 542 may be configured to shear at or above a threshold torque. For example, one or more of the third diameter, the material, and/or the thickness of the shear section 542 may be determined and/or configured based on the threshold torque.

The shear coupling 515 may be configured to receive the extension 513 and the head 512. For example, the shear coupling 515 may define an orifice 509. The orifice 509 may extend through the upper head 520, the shear section 542, and the lower head 525. For example, the orifice 509 may start at a top surface 552 of the upper head 520 and may terminate at a bottom surface 554 of the lower head 525. The orifice 509 may be configured to receive the head 512. For example, the orifice 509 may be hexagonal-shaped within the lower head 525 such that the head 512 is received within the orifice 509. The lower head 525 may transfer an external torque to the head 512 of the bolt 510. The orifice 509 may have different shapes and or sizes within the shear coupling 515. Within the upper head 520, the orifice 509 may be shaped similar to the extension 513 such that the extension 513 is received within the orifice 509. For example, the orifice 509 may be cylindrical within the upper head 520.

The shear coupling 515 and the extension 513 may be configured such that the shear coupling 515 can be attached to the bolt 510 using a tool. For example, the extension 513 may extend above an upper inner surface 541 of the upper head 520. The upper inner surface 541 may be a shoulder defined within the orifice 509. A tool (e.g., a punch) may be used to deform an upper portion of the extension 513 such that the upper portion 507 extends onto (e.g., partially onto) the upper inner surface 541 of the upper head 520. For example, the tool may be forcibly inserted into the cavity 508. The tool may be tapered such that the further the tool is inserted within the cavity 508, the greater the upper portion 507 is deformed. The deformed upper portion 507 of the extension 513 may be configured to retain the shear coupling 515 to the bolt 510. For example, the deformed upper portion 507 of the extension 513 may be configured to prevent the shear coupling 515 from being removed from the bolt 510.

The captive shear bolt assembly 500 may be configured to be driven at the shear coupling 515, for example, the upper head 520 of the shear coupling 515. As torque is applied to the upper head 520, the captive shear bolt assembly 500 may rotate as the threaded portion 518 engages complementary threads, namely, threads in opening 214 of fixed jaw 202 and threads in opening 226 of moveable jaw 204 so that when fixed jaw 202 and moveable jaw 204 are placed around insulator 104, captive shear bolt assembly 500 is then rotated in the first direction to move captive shear bolt assembly 500 in the direction A, shown in FIG. 18, and stop ridge 538 of captive shear bolt assembly 500 moves moveable jaw 204 in direction A to move protruded side 222 of moveable jaw 204 closer to top member 210 of fixed jaw 202 moving two jaw faces 208 closer together connecting the modified clamp 1600 to insulator 104. When the applied torque exceeds a threshold torque, the shear section 542 of the shear coupling 515 may shear such that the upper head 520 is mechanically decoupled from the threaded portion 518 of the bolt 510. For example, when the shear section 542 shears, the upper head 520 may no longer drive the threaded portion 518 of the bolt 510. When the shear section 542 of the shear coupling 515 shears, the deformed upper portion 507 of the extension 513 may captively secure the upper head 520 to the bolt 510. For example, the deformed upper portion 507 of the extension 513 may be configured such that the shear coupling 515 remains coupled to the bolt 510 when the shear section 542 has sheared. Similar to torque bolt 1606, once a predetermined amount of tension is applied to the modified clamp 1600, then captive shear bolt assembly 500 breaks along shear section 542. This will ensure adequate tension is applied to the overall clamp 1600 as well as eliminate risk of overtightening.

Figure 30:
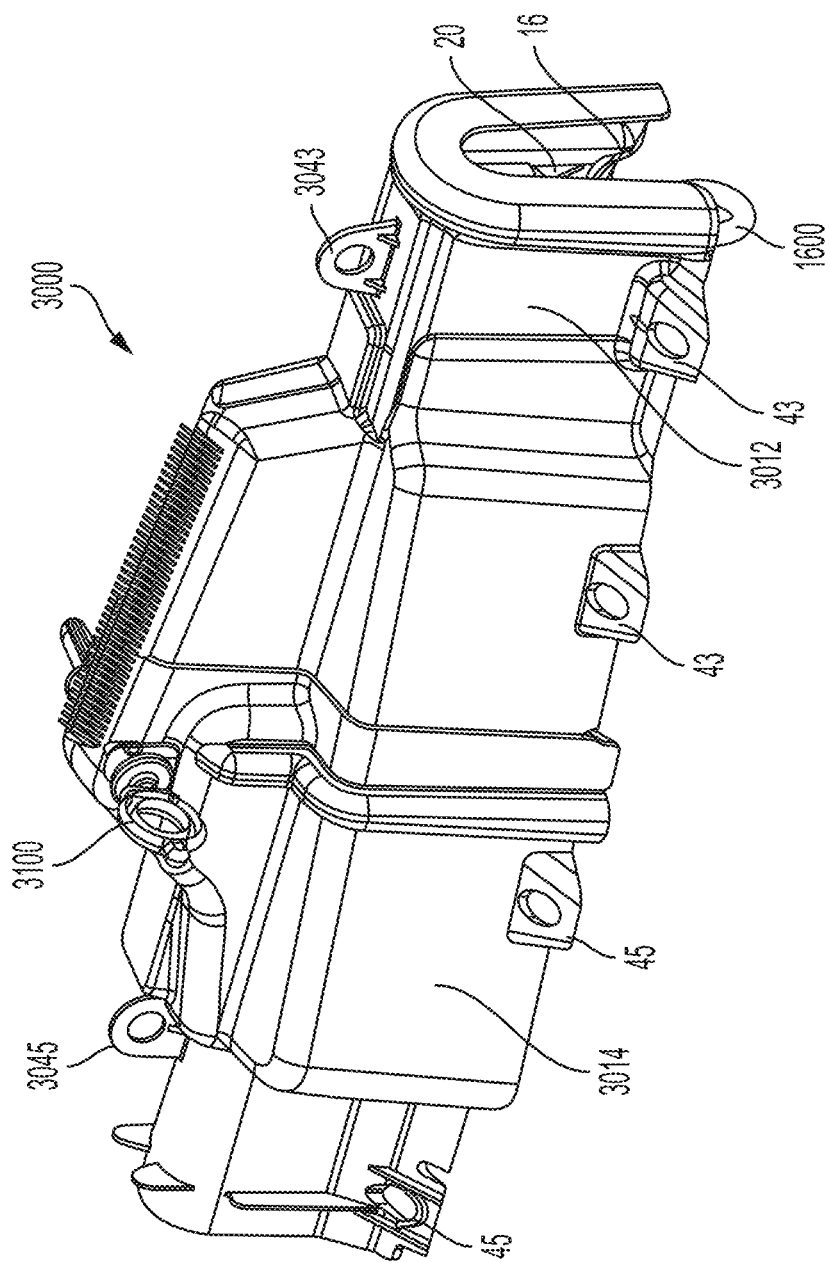
FIG. 30 is a rear, top perspective view of the guard assembly of FIG. 1 that is modified to include a pin and having the pin connected.

Referring to FIG. 30, guard assembly 10 can be modified to guard assembly 3000. Guard assembly 3000 is the same as guard assembly 10 except guard assembly 3000 has first guard cover portion 12 and second guard cover portion 14 modified to first guard cover portion 3012 and second guard cover portion 3014 that connect to a pin 3100, and, accordingly, the features that are the same for guard assembly 10 and guard assembly 3000 use the same reference numerals. Advantageously, pin 3100 is incorporated into first guard cover portion 3012 and second guard cover portion 3014 to retain them in relation to each other. Once installed, pin 3100 removes all risk of separation of first guard cover portion 3012 and second guard cover portion 3014.

Figure 31:
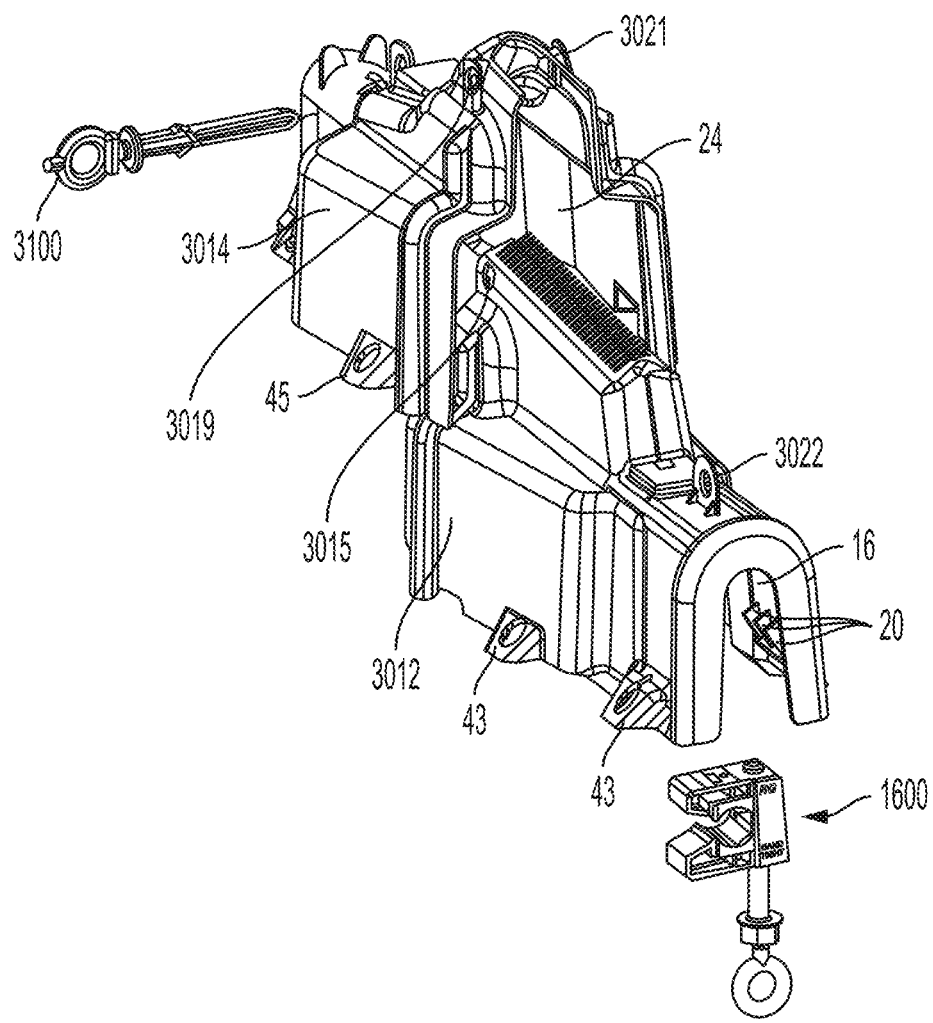
FIG. 31 is an exploded top perspective view of the guard assembly of FIG. 30 having the pin disconnected.
Figure 32:
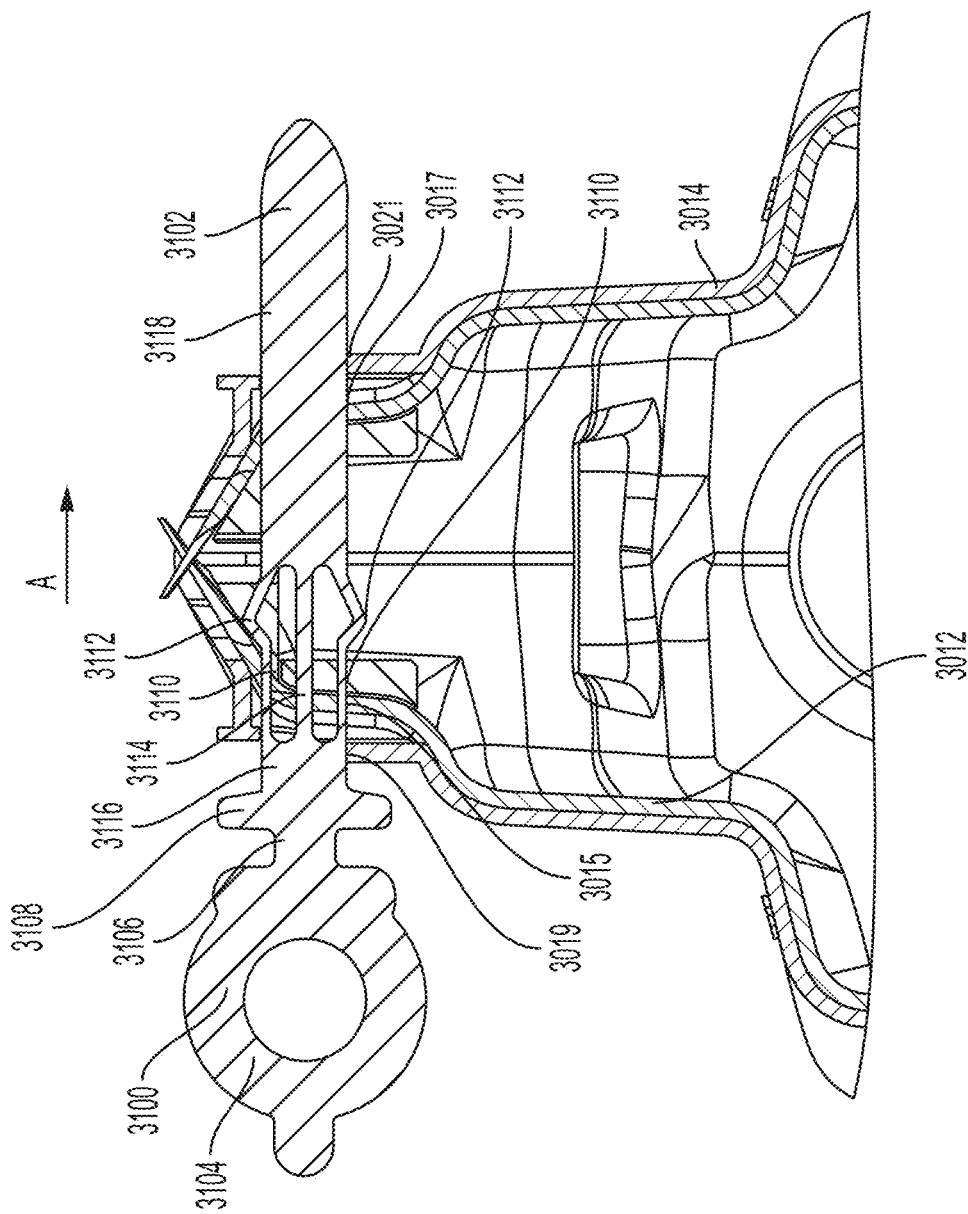
FIG. 32 is a partial side cross-sectional view of the guard assembly of FIG. 30 having the pin connected.

Referring to FIG. 31, first guard cover portion 3012 is the same as first guard cover portion 12 except first guard cover portion 3012 is modified to include a first hole 3015 and a second hole 3017 (FIG. 32) and a first loop 3043. Second guard cover portion 3014 is the same as second guard cover portion 14 except second guard cover portion 3014 is modified to include a third hole 3019 and a fourth hole 3021 and a second loop 3045. First loop 3043 and second loop 3045 are each hot stick loops allowing for hanging above equipment, for example, power line assembly 100, to locate as well as another attachment point to push down into the equipment if necessary/advantageous, and serve the same purpose as first loops 43 and second loops 45.

Referring to FIG. 33, pin 3100 has a body portion 3102 connected to a ring portion 3104 by a connection portion 3106. A ridge 3108 is formed between connection portion 3106 and body portion 3102. Body portion 3102 has flexible members 3110 that each form a protrusion 3112. A support member 3114 is inside of flexible members 3110 connecting a first portion 3116 of body portion 3102 to a second portion 3118 of body portion 3102. Flexible members 3110 are flexible so that they can deform towards support member 3114 and are biased away from support member 3114 to maintain a shape shown in FIG. 31.

In use, guard assembly 3000 is installed the same as guard assembly 10 with the additional steps of connecting pin 3100 to first guard cover portion 3012 and second guard cover portion 3014. Pin 3100 can be connected to first guard cover portion 3012 and second guard cover portion 3014 by using a hot stick. In addition, when second guard cover portion 3014 overlaps and clips by snap fit into first guard cover portion 3012, which is the same as second guard cover portion 14 overlapping and clipping by snap fit into first guard cover portion 12, first hole 3015 through first guard cover portion 3012 aligns with third hole 3019 through second guard cover portion 3014 and second hole 3017 through first guard cover portion 3012 aligns with fourth hole 3021 through second guard cover portion 3014. Second portion 3118 of body portion 3102 of pin 3100 passes through third hole 3019 through second guard cover portion 3014 and first hole 3015 through first guard cover portion 3012, and, then, passes through second hole 3017 through first guard cover portion 3012 and fourth hole 3021 through second guard cover portion 3014 so that flexible members 3110 pass through third hole 3019 through second guard cover portion 3014 and first hole 3015 through first guard cover portion 3012. When flexible members 3110 pass through third hole 3019 through second guard cover portion 3014 and first hole 3015 through first guard cover portion 3012, a force is applied to pin 3100 in a direction A so that flexible members 3110 deform inward toward support member 3114 allowing protrusions 3112 to pass through third hole 3019 through second guard cover portion 3014 and first hole 3015 through first guard cover portion 3012 positioning protrusions 3112 inside first guard cover portion 3012 and second guard cover portion 3014. Once protrusions 3112 are inside first guard cover portion 3012 and second guard cover portion 3014, then flexible members 3110 are biased outwards so that pin 3100 has a larger size at protrusions 3112 than third hole 3019 through second guard cover portion 3014 and first hole 3015 through first guard cover portion 3012 to maintain a connection between first guard cover portion 3012 and second guard cover portion 3014 unless a second force is applied in a direction that is opposite direction A that is strong enough to deform flexible members 3110 inward toward support member 3114 allowing protrusions 3112 to pass through first hole 3015 through first guard cover portion 3012 and third hole 3019 through second guard cover portion 3014 positioning protrusions 3112 outside first guard cover portion 3012 and second guard cover portion 3014, which will allow first guard cover portion 3012 and second guard cover portion 3014 to be separated.

It should also be noted that the terms "first", "second", "third", "upper", "lower", and the like may be used herein to modify various elements. These modifiers do not imply a spatial, sequential, or hierarchical order to the modified elements unless specifically stated.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

PARTS LIST

| | | |
|---|---|---|
| guard assembly 10 | jaw face 208 | clamp 1600 |
| first guard cover portion 12 | top member 210 | torque bolt 1606 |
| | depression 211 | bolt body 1634 |
| second guard cover portion 14 | bottom member 212 | threads 1635 |
| | opening 214 | mating portion 1636 |
| first side opening 16 | edge walls 215, 217 | stop ridge 1638 |
| first middle opening 18 | slot 216 | loop ridge 1640 |
| first open bottom 21 | jaw body 218 | loop 1642 |
| clip portions 20 | depression 220 | hex head 1644 |
| second side opening 22 | protruded side 222 | necked down area 1646 |
| second middle opening 24 | receiving side 224 | hot stick 1900 |
| | grooves 225, 227 | captive shear bolt assembly 100' |
| second open bottom 26 | opening 226 | |
| sides 30, 32 | slider 229 | bolt 110' |
| middle surface 34 | face body 228 | head 112' |
| slanted surfaces 36, 38 | mating portion 230 | shank 114' |
| first loops 43 | insulator receiving side 232 | stud 115' |
| second loops 45 | | shoulder 116' |
| power line assembly 100 | bolt body 234 | cap nut 120' |
| conductor 101 | threads 235 | top surface 122' |
| deadend clamp 102 | mating portion 236 | bottom surface 123' |
| insulator 104 | stop ridge 238 | threaded portion 118' |
| sheds 106 | loop ridge 240 | non-threaded portion 124' |
| first shed 106a | loop 242 | |
| clamp 200 | shear section 342 | protrusion 128' |
| fixed jaw 202 | top portion 344 | screw 130' |
| moveable jaw 204 | internal threads 346 | threads 132' |
| bolt 206 | bottom portion 348 | head 134' |
| recessed drive hole 136' | orifice 350 | stop ridge 538 |
| stop ridge 138' | top surface 352 | upper inner surface 541 |
| cavity 140' | bottom surface 354 | shear section 542 |
| shear section 142' | axis of rotation 360 | top surface 552 |
| external threads 144' | captive shear bolt assembly 500 | bottom surface 554 |
| internal threads 146' | | guard assembly 3000 |
| orifice 150' | upper portion 507 | first guard cover portion 3012 |
| top surface 152' | cavity 508 | |
| axis of rotation 160' | orifice 509 | second guard cover portion 3014 |
| captive shear bolt assembly 300 | bolt 510 | |
| | head 512 | first hole 3015 |
| bolt 310 | extension 513 | second hole 3017 |
| head 312 | shank 514 | third hole 3019 |
| shank 314 | shear coupling 515 | fourth hole 3021 |
| shear coupling 315 | shoulder 516 | first loop 3043 |
| a shoulder 316 | groove 517 | second loop 3045 |
| threaded portion 318 | threaded portion 518 | pin 3100 |
| upper head 320 | internal threads 519 | body portion 3102 |
| top surface 322 | upper head 520 | ring portion 3104 |
| bottom surface 323 | cavity 521 | connection portion 3106 |
| non-threaded portion 324 | top surface 522 | ridge 3108 |
| | bottom surface 523 | flexible members 3110 |
| lower head 325 | non-threaded portion 524 | protrusion 3112 |
| distal end 326 | | support member 3114 |
| protrusion 328 | lower head 525 | first portion 3116 |
| screw 330 | distal end 526 | second portion 3118 |
| threads 332 | | |
| head 334 | | |
| drive recess 336 | | |
| stop ridge 338 | | |
| cavity 340 | | |

What is claimed is:

1. A guard assembly comprising:
a guard cover portion to cover a power line assembly, the power line assembly having an insulator and a conductor, the guard cover portion having a first side opening so that the insulator can pass through the first side opening and a second side opening opposite the first side opening so that the conduction can pass through the second side opening; and a clamp that connects to the insulator, and the guard cover portion being connectable on the clamp.

2. The guard assembly of claim 1, wherein the clamp has a fixed jaw and a moveable jaw that are moveable relative to one another to accommodate different sizes of the insulator.

3. The guard assembly of claim 2, wherein the clamp has a bolt that passes through the fixed jaw and the moveable jaw, and wherein the bolt is rotatable to move the fixed jaw and the moveable jaw relative to one another.

4. The guard assembly of claim 3, wherein the clamp has a first jaw face that fits in the fixed jaw and a second jaw face that fits in the moveable jaw so that the first jaw face is opposite the second jaw face.

5. The guard assembly of claim 2, wherein the fixed jaw has a slot that forms edge walls on opposite sides of the slot and the moveable jaw has grooves on opposite sides of a slider, and wherein the slider is moveable in the slot.

6. The guard assembly of claim 3, wherein the fixed jaw has an opening that has threads and the moveable jaw has an opening that has threads, and wherein the bolt has threads that mate with the threads of the opening in the fixed jaw and the threads in the opening in the moveable jaw.

7. The guard assembly of claim 1, wherein the guard cover portion is a first guard cover portion that connects to a second guard cover portion, and wherein the first guard cover portion and second guard cover portion are sized to fit over the power line assembly that includes a deadend clamp.

8. The guard assembly of claim 1, wherein the guard cover portion is a first guard cover portion that connects to a second guard cover portion, and wherein the first guard cover portion and the second guard cover portion are sized to fit over the power line assembly that includes a wedge.

9. The guard assembly of claim 1, wherein the clamp is made of a thermoplastic compound.

10. A method of installing a guard assembly, the method comprising:

attaching a clamp to an insulator of a power line and pivoting the clamp to ensure it is tightened in a vertical orientation;

connecting a guard cover portion to the clamp to overlap a portion of the insulator, the guard cover portion having a first side opening so that the insulator can pass through the first side opening and a second side opening opposite the first side opening so that a conductor can pass through the second side opening.

11. The method of claim 10, wherein the guard cover portion is a first guard cover portion, and further comprising connecting a second guard cover portion to the first guard cover portion.

12. The method of claim 10, wherein the clamp attaches to the insulator between a first shed and a wedge.

13. The method of claim 10, wherein the clamp has a fixed jaw and a moveable jaw that are moveable relative to one another to accommodate different sizes of the insulator, and further comprising moving the fixed jaw and the moveable jaw closer to one another to connect the clamp to the insulator.

14. The method of claim 10, wherein the clamp has a fixed jaw and a moveable jaw that are moveable relative to one another to accommodate different sizes of the insulator and the fixed jaw has an opening that has threads and the moveable jaw has an opening that has threads, and wherein a bolt has threads that mate with the threads of the opening in the fixed jaw and the threads in the opening in the moveable jaw, and further comprising rotating the bolt to move the fixed jaw and the moveable jaw closer to one another to connect the clamp to the insulator.

15. A guard assembly comprising:

a power line assembly having a conductor connected to a deadend clamp and an insulator;

a clamp connected to the insulator;

a first guard cover portion, the first guard cover portion connected onto the clamp, the first guard cover portion having a first side opening so that the insulator can pass through the first side opening; and a second guard cover portion that is connected to the first guard cover portion to cover the power line assembly, the second guard cover portion having a second side opening opposite the first side opening so that the conductor can pass through the second side opening.

16. The guard assembly of claim 15, wherein the clamp has a fixed jaw and a moveable jaw that are moveable relative to one another to move closer to one another to connect to the insulator.

17. The guard assembly of claim 16, wherein the clamp has a bolt that passes through the fixed jaw and the moveable jaw, and wherein the bolt is rotatable to move the fixed jaw and the moveable jaw relative to one another.

18. The guard assembly of claim 17, wherein the clamp has a first jaw face that fits in the fixed jaw and a second jaw face that fits in the moveable jaw so that the first jaw face is opposite the second jaw face to contact the insulator.

19. The guard assembly of claim 16, wherein the fixed jaw has a slot that forms edge walls on opposite sides of the slot and the moveable jaw has grooves on opposite sides of a slider, and wherein the slider is moveable in the slot.

20. The guard assembly of claim 17, wherein the fixed jaw has an opening that has threads and the moveable jaw has an opening that has threads, and wherein the bolt has threads that mate with the threads of the opening in the fixed jaw and the threads in the opening in the moveable jaw.

21. A guard assembly comprising:

a guard cover portion to cover a power line assembly, the power line assembly having an insulator; and a clamp that connects to the insulator, and the guard cover portion clipping onto the clamp, where the clamp has a fixed jaw and a moveable jaw that are moveable relative to one another to accommodate different sizes of the insulator, wherein the clamp has a bolt that passes through the fixed jaw and the movable jaw, wherein the bolt is rotatable to move the fixed jaw and the moveable jaw relative to one another, and wherein the bolt is a torque bolt having a necked down area that is broken during installation of the guard assembly when a predetermined tension is applied.

22. The guard assembly of claim 21, wherein the torque bolt has a hex head above the necked down area and a loop below the necked down area.

23. The guard assembly of claim 3, wherein the bolt is a captive shear bolt assembly having a shear section that is broken during installation of the guard assembly when a predetermined tension is applied, and wherein, when the shear section has sheared, an upper head or stud remains connected to a remainder of the captive shear bolt assembly.

24. The guard assembly of claim 15, further comprising a pin that passes through the first guard cover portion and the second guard cover portion.

* * * * *